United States Patent
Kim et al.

(10) Patent No.: US 11,070,404 B2
(45) Date of Patent: Jul. 20, 2021

(54) METHOD AND APPARATUS FOR DETECTING SIGNAL IN WIRELESS COMMUNICATION SYSTEM

(71) Applicants: Samsung Electronics Co., Ltd., Gyeonggi-do (KR); Industry-Academic Cooperation Foundation, Yonsei University, Seoul (KR)

(72) Inventors: Jaewon Kim, Seoul (KR); Sooyong Choi, Seoul (KR); Gyuyeol Kong, Seoul (KR); Junggyun Park, Seoul (KR)

(73) Assignees: Samsung Electronics Co., Ltd; Industry-Academic Cooperation Foundation, Yonsei University

( * ) Notice: Subject to any disclaimer, the term of this patent is extended or adjusted under 35 U.S.C. 154(b) by 0 days.

(21) Appl. No.: 16/641,500

(22) PCT Filed: Aug. 24, 2018

(86) PCT No.: PCT/KR2018/009803
§ 371 (c)(1),
(2) Date: Feb. 24, 2020

(87) PCT Pub. No.: WO2019/039910
PCT Pub. Date: Feb. 28, 2019

(65) Prior Publication Data
US 2021/0135909 A1    May 6, 2021

(30) Foreign Application Priority Data

Aug. 24, 2017  (KR) .................. 10-2017-0107357

(51) Int. Cl.
*H04L 25/03*     (2006.01)
*H04B 7/0413*    (2017.01)
(Continued)

(52) U.S. Cl.
CPC ..... *H04L 25/03178* (2013.01); *H04B 7/0413* (2013.01); *H04L 1/0054* (2013.01); *H04L 25/067* (2013.01)

(58) Field of Classification Search
CPC ............ H04L 25/03178; H04L 25/067; H04L 1/0054; H04B 7/0413
See application file for complete search history.

(56) References Cited

U.S. PATENT DOCUMENTS 7,782,984 B2 *   8/2010   Garrett ............. H04L 25/03242
                                                        375/340
8,503,544 B2 *   8/2013   Chockalingam ...... H04L 1/0631
                                                        375/259

(Continued)

FOREIGN PATENT DOCUMENTS

KR    1020180103389    9/2018

OTHER PUBLICATIONS

PCT/ISA/210 Search Report issued on PCT/KR2018/009803, pp. 5.
(Continued)

*Primary Examiner* — Vineeta S Panwalkar
(74) *Attorney, Agent, or Firm* — The Farrell Law Firm, P.C.

(57) ABSTRACT

The present disclosure relates to a pre-$5^{th}$-Generation (5G) or 5G communication system to be provided for supporting higher data rates beyond $4^{th}$-Generation (4G) communication system such as long-term evolution (LTE). An operating method of a reception device in a wireless communication system includes: receiving a signal transmitted through a plurality of antennas of a transmission device; determining an initial symbol vector based on the signal; determining a first candidate symbol vector based on a plurality of solution vectors which are obtained by a search on the initial symbol vector; determining a second candidate symbol vector by flipping at least one symbol value of the first candidate (Continued)

symbol vector; and determining a symbol vector transmitted from the transmission device based on at least a portion of the second candidate symbol vector.

20 Claims, 10 Drawing Sheets

(51) Int. Cl.
*H04L 1/00* (2006.01)
*H04L 25/06* (2006.01)

(56) References Cited

U.S. PATENT DOCUMENTS

| | | |
|---|---|---|
| 10,505,673 B2 | 12/2019 | Kim et al. |
| 2013/0039436 A1 | 2/2013 | Chockalingam et al. |
| 2013/0315356 A1 | 11/2013 | Chockalingam et al. |

OTHER PUBLICATIONS

PCT/ISA/237 Written Opinion issued on PCT/KR2018/009803, pp. 7.

Hong, Y. et al., "Genetic algorithms with applications in wireless communications", International Journal of Systems Science, vol. 35, No. 13-14, . . . Oct. 20-Nov. 15, 2004, pp. 751-762.

Srinidhi, N. et al., "Near-ML Signal Detection in Large-Dimension Linear Vector Channels Using Reactive Tabu Search", arXiv:0911.4640v1, Nov. 24, 2009, pp. 11.

Wu, Yun et al., "FPGA-based Tabu Search for Detection in Large-Scale MIMO Systems", 2014 IEEE Workshop on Signal Processing Systems (SiPS), Belfast, 2014, pp. 1-6.

Srinidh, N. et al., "Layered Tabu Search Algorithm for Large-MIMO Detection and a Lower Bound on ML Performance", IEEE Transactions on Communications, vol. 59, No. 11, . . . Nov. 2011, pp. 2955-2963.

* cited by examiner

METHOD AND APPARATUS FOR DETECTING SIGNAL IN WIRELESS COMMUNICATION SYSTEM

PRIORITY

This application is a National Phase Entry of PCT International Application No. PCT/KR2018/009803, which was filed on Aug. 24, 2018, and claims priority to Korean Patent Application No. 10-2017-0107357, which was filed on Aug. 24, 2017, the content of each of which are incorporated herein by reference.

TECHNICAL FIELD

The present disclosure relates to a wireless communication system, and more particularly, to a method and an apparatus for detecting a signal in a wireless communication system.

BACKGROUND ART

To meet the demand for wireless data traffic having increased since deployment of 4th generation (4G) communication systems, efforts have been made to develop an improved 5th generation (5G) or pre-5G communication system. Therefore, the 5G or pre-5G communication system is also called a 'Beyond 4G Network' or a 'Post Long Term Evolution (LTE) System'. The 5G communication system is considered to be implemented in higher frequency (mm-Wave) bands, e.g., 28 GHz or 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems.

In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like.

In the 5G system, Hybrid frequency shift keying (FSK) and quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

A higher order modulation/demodulation method used to transmit and receive signals in a wireless communication system may enhance transmission efficiency within restricted frequency resources. For example, according to the higher order modulation/demodulation method, more bits may be allocated to a single transmission symbol. When such higher order modulation/demodulation technology is utilized in a multiple input multiple output (MIMO) antenna system, there is an advantage that a communication capacity can be dramatically enhanced without additional frequency allocation or without increasing power. However, since computational complexity exponentially increases as the number of transmission antennas and the modulation order increase, a reception technique of high complexity may be required in order to achieve performance near to maximum likelihood (ML) in detecting a signal.

DISCLOSURE OF INVENTION

Technical Problem

Based on the above-described discussion, the present disclosure provides a method and an apparatus for efficiently detecting a signal in a wireless communication system.

Various embodiments of the present disclosure provide a method and an apparatus for enhancing bit error rate (BER) performance regarding a received signal in a wireless communication system.

Various embodiments of the present disclosure provide a method and an apparatus for reducing latency for detecting a signal in a wireless communication system.

Various embodiments the present disclosure provide a method and an apparatus for enhancing reception performance by individually performing a symbol vector search with respect to a plurality of symbol vectors in a wireless communication system.

Solution to Problem

According to various embodiments of the present disclosure, an operating method of a reception device in a wireless communication system includes: receiving a signal transmitted through a plurality of antennas of a transmission device; determining an initial symbol vector based on the signal; determining a first candidate symbol vector based on a plurality of solution vectors which are obtained by a search on the initial symbol vector; determining a second candidate symbol vector by flipping at least one symbol value of the first candidate symbol vector; and determining a symbol vector transmitted from the transmission device based on at least a portion of the second candidate symbol vector.

According to various embodiments of the present disclosure, a reception device in a wireless communication system includes: a transceiver configured to receive a signal transmitted through a plurality of antennas of a transmission device; and at least one processor configured: to determine an initial symbol vector based on the signal, the initial symbol vector including a plurality of symbols corresponding to the plurality of antennas of the transmission device, respectively; to determine a first candidate symbol vector based on a plurality of solution vectors which are obtained by a search on the initial symbol vector; to determine a second candidate symbol vector by flipping at least one symbol value of the first candidate symbol vector; and to determine a symbol vector transmitted from the transmission device based on at least a portion of the second candidate symbol vector.

Advantageous Effects of Invention

The method and the apparatus according to various embodiments of the present disclosure can enhance a BER by performing a neighbor search based on symbol flipping.

The effects that can be achieved by the present disclosure are not limited to those mentioned in the above, and other effects that are not mentioned herein could be clearly understood by a person skilled in the art based on the following descriptions.

BEST MODE FOR CARRYING OUT THE INVENTION

Terms used in the present disclosure are used to describe specified embodiments and are not intended to limit the scope of other embodiments. The terms of a singular form may include plural forms unless otherwise specified. All of the terms used herein, which include technical or scientific terms, may have the same meaning that is generally understood by a person skilled in the art. It will be further understood that terms, which are defined in a dictionary, may be interpreted as having the same or similar meanings as or to contextual meanings of the relevant related art and not in an idealized or overly formal way, unless expressly so defined herein in the present disclosure. In some cases, even if terms are terms which are defined in the specification, they should not be interpreted as excluding embodiments of the present disclosure.

In various embodiments of the present disclosure described below, hardware-wise approach methods will be described by way of an example. However, various embodiments of the present disclosure include technology using both hardware and software, and thus do not exclude software-based approach methods.

The present disclosure relates to an apparatus and a method for detecting a signal in a wireless communication system. Specifically, the present disclosure describes operations for enhancing BER performance and reducing complexity and latency by performing a tabu search based on symbol flipping.

As used herein, terms indicating control information, terms for arithmetic operation states (for example, step, operation, procedure), terms indicating data (for example, information, bit, symbol), terms indicating network entities (for example, a reception device, a transmission device), terms indicating messages (for example, signal, data, signaling, symbol, stream), and terms indicating elements of a device are examples for convenience of explanation. Accordingly, the present disclosure is not limited to the terms described below, and other terms having the same technical meanings may be used.

In addition, various embodiments of the present disclosure may be easily modified and applied to other communication systems. In addition, the present disclosure describes unidirectional communication by way of an example for convenience of explanation, but the apparatus and the method according to various embodiments can be applied to bidirectional communication.

Figure 1:
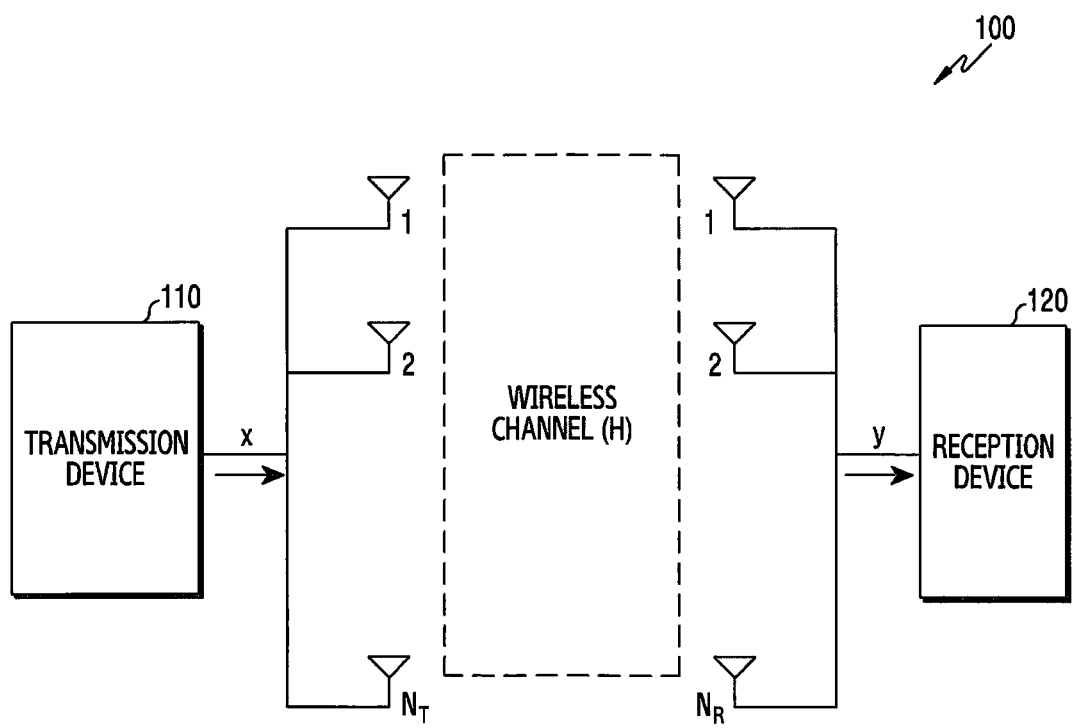
FIG. 1 is a view illustrating a wireless communication environment according to various embodiments of the present disclosure.

FIG. 1 is a view illustrating a wireless communication environment 100 according to various embodiments of the present disclosure. The wireless communication environment 100 may include a transmission device 110 and a reception device 120.

Referring to FIG. 1, the transmission device 110 may transmit a signal to the reception device 120. In other words, the reception device 120 may receive a signal from the transmission device 110. The reception device 120 may support a plurality of reception algorithms to detect a signal. For example, the reception device 120 may support at least one of maximum likelihood (ML), zero forcing (ZF), minimum mean square error (MMSE), successive interference cancelation (MMSE-SIC), integer forcing (IF) techniques. The reception device 120 may select one of the plurality of reception algorithms based on control information on the reception device 120, setting information, or information measured by the transmission device 110, and may use the selected algorithm to process the received signal.

The transmission device 110 and the reception device 120 are distinguished from each other according to a transmission direction of a signal. Accordingly, when the transmission direction of the signal is changed, the transmission device 110 may function as the reception device 120, and to the contrary, the reception device 120 may function as the transmission device 110. For example, in downlink communication, the transmission device 110 may be a base station and the reception device 120 may be a terminal. In another example, in uplink communication, the transmission device 110 may be a terminal and the reception device 120 may be a base station. In addition, in device to device (D2D) communication, the transmission device 110 may be a terminal and the reception device 120 may be another terminal. Herein, the D2D communication may be referred to as sidelink communication. In addition, the transmission device 110 may be a base station, and the reception device 120 may be another base station. In addition to the above-listed examples, the transmission device 110 and the reception device 120 may be various other devices.

Herein, the base station may be a network element (NE) that provides a wireless access to terminals. The base station may be referred to as an "access point (AP)," an "eNodeB (eNB)," a $5^{th}$ generation node (5G node)", a "5G nodeB (NB)," "a wireless point," a "transmission/reception point (TRP)", or other terms having the same technical meaning as those of the above-mentioned terms.

Herein, the terminal is a device that is used by a user, and may communicate with the base station via a wireless channel. The terminal may be referred to as "user equipment (UE)," a "mobile station," a "subscriber station," a "remote terminal," a "wireless terminal," an "electronic device," or a "user device," or other terms having the same technical meaning as those of the above-mentioned terms.

A signal received by the reception device 120 may be expressed by Equation 1 presented below:

$$Y=HX+Z \quad \text{Equation 1}$$

where Y is a signal received by the reception device 120, and X is a signal transmitted by the transmission device 110. H is a channel matrix between the transmission device 110 and the reception device 120. Z is a noise between channels. When the number of antennas of the transmission device 110 is $N_T$, and the number of antennas of the reception device 120 is $N_R$, X is a vector of $N_T \times 1$, Y and Z are vectors of $N_R \times 1$, and H is a matrix of $N_R \times N_T$.

Although the transmission device and the reception device are distinguished from each other in FIGS. 2 to 10, this is merely an example for convenience of explanation, and functions of the devices are not limited by their names. In the description which will be made with reference to FIGS. 2 to 10, it is assumed that a symbol vector regarding a received signal is a four-dimensional vector according to the number of transmission antennas. However, this is merely for convenience of explanation, and various embodiments of the present disclosure can be equally applied to a case in which the reception device 120 receives signals transmitted through various numbers of antennas of the transmission device 110. In this case, the dimension of the symbol vector regarding the received signal may be changed according to the number of antennas of the transmission device 110.

Figure 2:
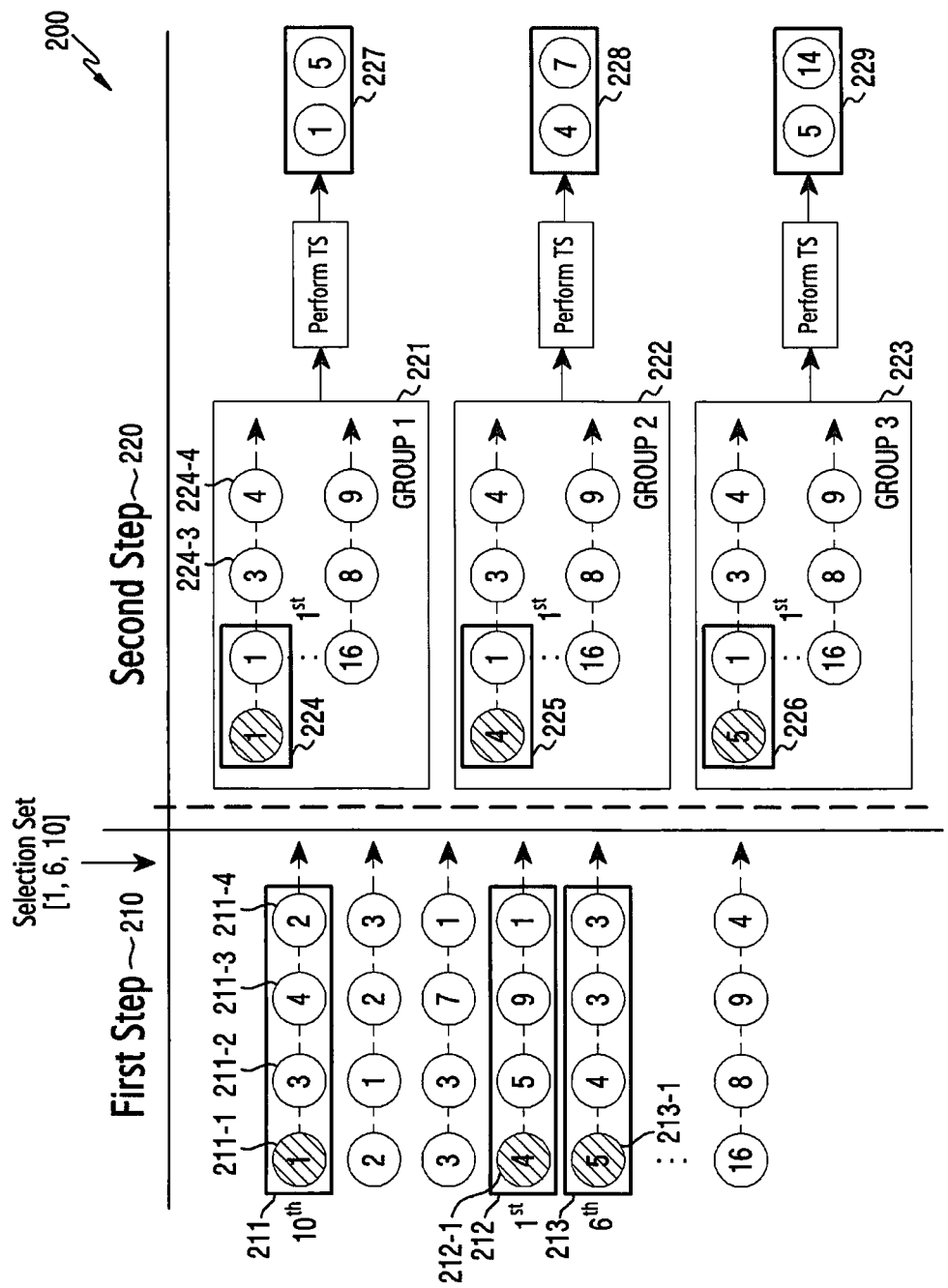
FIG. 2 is a view illustrating a signal detection procedure according to a tabu search according to various embodiments of the present disclosure.

FIG. 2 is a view illustrating a signal detection procedure according to a tabu search according to various embodiments of the present disclosure. FIG. 2 illustrates a procedure of the reception device 120 receiving signals transmitted through four transmission antennas (for example, a first transmission antenna, a second transmission antenna, a third transmission antenna, a fourth transmission antenna) of the transmission device 110, and detecting the transmission signals. According to an embodiment of FIG. 2, the reception device 120 may detect symbols regarding the signals received from the transmission device 110 based on a reception algorithm. That is, the reception device 120 may detect a four-dimensional symbol vector including respective symbols corresponding to the four transmission antennas of the transmission device 110. In the case of N transmission antennas, the reception device 120 may detect a N-dimensional symbol vector.

The symbol detection procedure of FIG. 2 may include processes of four steps. The reason why the symbol detection procedure includes processes of four steps is that it is assumed that the reception device 120 receives signals transmitted through four transmission antennas of the transmission device 110. However, FIG. 2 illustrates only initial two steps (a first step 210 and a second step 220) in the processes of the four steps, for convenience of explanation. The reception device 120 may determine symbols which are estimated as being transmitted through each transmission antenna in sequence at each step. For example, the reception device 120 may determine symbols which are estimated as being transmitted from a first transmission antennas at the first step 210, and at the step 220, the reception device 120 may remove interference from the received signal on the assumption that the symbols determined at the first step 210 are transmitted through the first transmission antenna, and may determine symbols which are estimated as being transmitted from the first transmission antenna and a second transmission antenna in the signal from which the interference is removed. By iterating this operation, the reception device 120 may determine symbols estimated as being transmitted from the first, second, and third transmission antennas at the third step, and may determine symbols estimated as being transmitted from the first, second, third, and fourth transmission antennas at the fourth step. The symbol detection procedure illustrated in FIG. 2 may include one or more steps performed before or after the four steps including the first step 210 and the second step 220. The one or more steps performed after or before the four steps will be described below with reference to FIGS. 3 to 10.

Some of the four steps may include a neighbor search method based on a heuristic approach method. The heuristic approach method is an approach method that finds a realizable solution by considering restricted information and restricted time. For example, the second step may include a tabu search (TS) method which is a neighbor search method receiving a hint from a memory structure among the heuristic approach methods.

According to the tabu search method, the reception device 120 may set an initial symbol vector (a first symbol vector), and may determine a symbol vector (a second symbol vector) associated with the first symbol vector by searching an adjacent region (a set of symbol vectors existing within a predetermined distance from a specific symbol vector) of the first symbol vector. For example, the reception device 120 may determine, as the second symbol vector, a symbol vector that has the lowest matric size regarding ML from among symbol vectors forming the adjacent region of the first symbol vector. The above-described process performed from the time that a specific symbol vector is determined until the time that a symbol vector associated with the specific symbol vector is determined may be referred to as "an iteration."

Thereafter, the reception device 120 may determine a symbol vector (for example, a third symbol vector) associated with the second symbol vector by searching an adjacent region of the second symbol vector. The process of determining the third symbol vector may be performed similarly to the process of determining the second symbol vector from the first symbol vector.

When the reception device 120 searches a next symbol vector having the lowest ML matric size in an adjacent region of a specific symbol vector, the same symbol vector may be iteratively searched. For example, by searching symbol vectors in order of the first symbol vector→the second symbol vector→the third symbol vector, and then searching an adjacent region of the third symbol vector, the reception device 120 may determine the second symbol vector as a symbol vector associated with the third symbol vector. When the reception device 120 determines the second symbol vector as the symbol vector associated with the third symbol vector, the reception device 120 iteratively searches only the first symbol vector, the second symbol vector, and the third symbol vector, and may not search other symbol vectors (for example, a fourth symbol vector). To solve this problem, the reception device 120 may set a mark indicating that a search has been performed at least one time until now for at least one symbol vector that has been searched until now. For example, the reception device 120 may set the mark indicating that the search has been performed at least one time for the second symbol vector. Accordingly, the reception device 120 may perform a search except for the marked second symbol vector when searching the adjacent region of the third symbol vector, thereby determining the fourth symbol vector which has not yet been searched.

Hereinafter, procedures performed at the first step 210 and the second step 220 will be described in more detail.

At the first step 201, the reception device 120 determines symbols estimated as being transmitted from the first transmission antenna. To achieve this, the reception device 120 may determine a temporary solution vector for each of the symbols transmittable from the first transmission antennas. Herein, the "transmittable symbols" refer to all symbols corresponding to a modulation order. For example, when the modulation order is 4 (for example, 16-QAM), 16 symbols in total may be considered. According to another embodiment, when the modulation order is other numbers than 4, transmittable symbols may be defined. For example, when the modulation order is 4, symbols transmittable from the first transmission antenna may be expressed by first elements 1, 2, 3, 4, 5, . . . , 16 forming 16 four-dimensional vectors. In another example, when the modulation order is 8, 256 symbols are transmittable from the first transmission antenna, and may be expressed by 1, 2, 3, 4, 5, . . . , 256.

For example, the temporary solution vector may be determined according to a detection technique having relatively low complexity, such as minimum mean square error (MMSE), MMSE-ordered successive interference cancellation (OSIC). The MMSE-OSCI technique refers to a technique which determines next symbols in sequence while removing interference on an already determined symbol in a received signal. Accordingly, when a symbol 211-1 transmittable from the first transmission antenna is determined, the reception device 120 may determine a temporary solution vector 211 for the symbol transmittable from the first transmission antenna, by determining a symbol 211-2 transmittable from the second transmission antenna, a symbol 211-3 transmittable from the third transmission antenna, and a symbol 211-4 transmittable from the fourth transmission antenna according to the MMSE-OSIC technique.

The temporary solution vector may refer to a combination of symbols estimated as being transmitted from the respective transmission antennas according to a specific matric or technique, and a solution vector may be one or more temporary solution vectors finally determined from among the temporary solution vectors. Hereinafter, the combination of symbols may be referred to as a "symbol combination" or "symbol vector." For example, as shown in FIG. 2, the temporary solution vector for the symbol 211-1 transmittable from the first transmission antenna may be determined as [1, 3, 4, 2] 211.

As shown in FIG. 2, the reception device 120 may determine temporary solution vectors for the respective symbols 1, 2, 3, 4, 5, . . . , 16 transmittable from the first transmission antenna. For example, a temporary solution vector for a symbol 212-1 transmittable from the first transmission antenna may be determined as [4, 5, 9, 1] 212, and a temporary solution vector for a symbol 213-1 transmittable from the first transmission antenna may be determined as [5, 4, 3, 3] 213. As shown in FIG. 2, the 16 temporary solution vectors may be determined at the first step 210.

After determining the temporary solution vectors for the respective symbols transmittable from the first transmission antenna, the reception device 120 may determine matric values of the temporary solution vectors. For example, the matric value may be ML. The ML matric may be expressed by Equation 2 presented below:\

$$x_{ML}=\arg\min\|y-H_x\|$$ Equation 2

Herein, $x_{ML}$ is an estimated transmission signal, y is a reception signal, H is a channel, and x is a transmission signal. The ML matric may be referred to as a Euclidean distance, The reception device 120 may determine or extract a predetermined number of temporary solution vectors from among the temporary solution vectors, based on the matric values of the temporary solution vectors. Herein, the predetermined number of temporary solution vectors determined or extracted may be referred to as "solution vectors." FIG. 2 illustrates the case where the temporary solution vectors 211, 212, 213 are selected as solution vectors.

The reception device 120 may determine a selection set for selecting temporary solution vectors to be extracted. The selection set may refer to a rule for selecting or extracting a predetermined number of temporary solution vectors from among all possible temporary solution vectors, to determine symbols estimated as being transmitted from one transmission antenna, or to determine symbol vectors estimated as being transmitted from a plurality of transmission antennas. Herein, the selection set may include a numerical value or an index indicating a size order of matric values of temporary solution vectors to be extracted. The number of numerical values or indexes included in the selection set may correspond to the number of temporary solution vectors to be extracted. For example, the reception device 120 may determine the selection set to [1, 6, 10], and this selection set may indicate that three temporary solution vectors will be extracted from among the temporary solution vectors. Specifically, this selection set may indicate that, when the temporary solution vectors are arranged by the size of the matric value, a temporary solution vector having the highest matric, a temporary solution vector having the sixth highest matric, and a temporary solution vector having the tenth highest matrix will be extracted.

The reception device 120 may determine the selection set according to a predetermined order, arbitrarily, or arbitrarily from among a plurality of selection sets fulfilling a predetermined condition. The predetermined condition may include at least a portion of an interval between numerical values included in the selection set, and a numerical value that should be necessarily included in the selection set. For example, when the predetermined condition is that "interval between numerical values included in the selection set≥3, and the numerical value that should be necessarily included=1," the reception device 120 may arbitrarily determine one selection set (for example, [1, 6, 10]) among the plurality of selection sets fulfilling the predetermined condition. In addition, the reception device 120 may determine temporary solution vectors (that is, the temporary solution vector 212 having the highest matric size, the temporary solution vector 213 having the sixth highest matric size, and the temporary solution vector 211 having the $10^{th}$ highest matric size) corresponding to the determined selection set.

FIG. 2 illustrates the case where three temporary solution vectors 211, 212, 213 are determined at the first step 210 (the predetermined number=3). However, the three temporary solution vectors determined are merely an example, and various numbers of temporary solution vectors may be determined according what the predetermined number is.

The reception device 200 may learn information regarding the numerical value or index included in the selection set (for example, the number of indexes, values of indexes, etc.) by itself. For example, the reception device 120 may apply one selection set from among the plurality of selection set candidates to embodiments of the present disclosure in sequence, and may learn to determine a selection set showing better performance (for example, BER performance).

The reception device 120 may determine a symbol estimated as being transmitted from the first transmission antennas, by extracting a symbol corresponding to the first transmission antenna from the predetermined number of temporary solution vectors. In FIG. 2, the reception device 120 may extract the symbols 211-1, 212-1, 213-1 corresponding to the first transmission antenna from the determined three temporary solution vectors 211, 212, 213. Herein, the symbols 211-1, 212-1, 213-1 corresponding to the first transmission antennas are symbols estimated as being transmitted from the first transmission antennas.

At the second step 220, the reception device 120 may determine combinations of the respective symbols of the symbols 211-1, 212-1, 213-1 determined at the first step 210, and symbols transmittable from the second transmission antenna. At the second step 220, the combinations of the symbols that may be determined by the reception device 120 may be determined according to a modulation order. For example, in the case of 16-QAM, the total number of combinations of symbols that may be determined by the reception device 120 may be 48 (3×16=48).

Similarly, at the first step 210, the reception device 120 may determine temporary solution vectors for the 48 combinations according the MMSE-OSIC technique. For example, the reception device 120 may determine a temporary solution vector for a symbol vector 224, by determining a symbol 224-3 transmittable from the third transmission antenna, and a symbol 224-4 transmittable from the fourth transmission antenna with respect to the symbol vector 224, in sequence, according to the MMSE-OSIC technique. In this way, the reception device 120 may determine temporary solution vectors for all of the 48 combinations.

The reception device 120 may classify the combinations of all temporary solution vectors that may be determined by the reception device 120 into one or more groups. The reception device 120 may classify the combinations of all of the temporary solution vectors that may be determined by the reception device 120 with reference to the symbols determined at the first step 210. For example, the reception device 120 may determine 16 temporary solution vectors which are generated based on combinations of the symbol 211-1 corresponding to the first transmission antenna in the temporary solution vector 211 determined as having the 10$^{th}$ highest matric size at the first step 210, and 16 symbols transmittable from the second transmission antenna. In addition, the reception device 120 may group the 16 temporary solution vectors to a group 1 221. In another example, the reception device 120 may determine 16 temporary solution vectors generated based on combinations of the symbol 212-1 corresponding to the first transmission antenna in the temporary solution vector 212 determined as having the highest matric size at the first step 210, and 16 symbols transmittable from the second transmission antenna, and may group the 16 temporary solution vectors to a second group 2 222. Similarly, the reception device 120 may determine a group 3 223.

At the second step 220, the reception device 120 may determine or extract a predetermined number of temporary solution vectors from among all of the temporary solution vectors. Herein, the predetermined number may be the number of numerical values or indexes included in the selection set.

However, in determining the predetermined number of temporary solution vectors, the reception device 120 may classify all of the temporary solution vectors into a predetermined number of groups (for example, 3 groups), and may determine one temporary solution vector from each group based on the ML matric, instead of determining the predetermined number (for example, 3) of temporary solution vectors from among all of the temporary solution vectors (that is, 48 temporary solution vectors) based on the ML matric. Herein, the predetermined number of groups classifying all of the temporary solution vectors may be groups (for example, group 1 221, group 2 222, group 3 223) classified with reference to the symbols determined at the first step 210. The reception device 120 may determine one temporary solution vector having the lowest ML matric in each of the groups 221, 222, 223, and may determine the symbol vectors 224, 225, 226 including the symbols corresponding to the first transmission antenna and the second transmission antenna from among the determined temporary solution vectors. Thereafter, the reception device 120 may determine combinations [1, 5] 227, [4, 7] 228, and [5, 14] 229 of the symbols transmitted from the first transmission antenna and the second transmission antenna, by individually performing a tabu search with respect to the respective symbol vectors 224, 225, 226.

The reception device 120 may iteratively perform the tabu search with respect to each of the symbol vectors 224, 225, 226 a predetermined number of times. The reception device 120 may obtain symbol vectors associated with each of the symbol vectors 224, 225, 226 every time the tabu search is performed with respect to each of the symbol vectors 224, 225, 226. For example, the reception device 120 may determine a symbol vector (for example, a second symbol vector) associated with the symbol vector 224 by searching an adjacent region of the symbol vector 224 (for example, a first symbol vector), and may determine a symbol vector (for example, a third symbol vector) associated with the second symbol vector, by searching an adjacent area of the second symbol vector. The above-described process performed from the time that a specific symbol vector is determined until the time that a symbol vector associated with the specific symbol vector is determined may be referred to as an "iteration.

The reception device 120 may iterate the above-described process a predetermined number of times. In addition, in iterating the above-described process the predetermined number of times, the reception device 120 intentionally exclude a symbol vector that has been previously searched, thereby preventing the iterative search of the same symbol vector. Specifically, the reception device 120 may set a mark indicating that the search has been performed for a symbol vector that has been searched, and may store and update a list of symbol vectors set with marks. In addition, the reception device 120 may search the list of the symbol vectors set with the marks every time one iteration is performed, and may intentionally exclude a symbol vector set with the mark not to be included in the result of a currently performed tabu search, thereby preventing the iterative search of the same symbol vector. The list of the symbol vectors set with the marks may be referred to as a tabu list.

The reception device 120 may generate, store, and search the list of the symbol vectors set with the marks according to each group, or may generate, store, and search one entire list without distinguishing the lists according to groups. In the latter case, the reception device 120 may update or search one pre-stored list when performing the tabu search with respect to each of the symbol vectors 224, 225, 226 the predetermined number of times. In other words, the reception device 120 may share one same list when performing the tabu search with respect to each of the symbol vectors 224, 225, 226. Accordingly, the reception device 120 may perform the tabu search with respect to the symbol vectors 225, 225, 226, such that overlapping symbol vectors are not fundamentally searched.

The reception device 120 may gradually expand the search region by iterating the tabu search the predetermined number of times. In addition, the reception device 120 may obtain a predetermined number of symbol vectors which do not include overlapping symbol vectors, by iterating the tabu search the predetermined number of times. Herein, the predetermined number may correspond to the predetermined number of times of iterations of the tabu search. Since the reception device 120 iteratively performs the tabu search to prevent the same symbol vector from being iteratively searched, the predetermined number of symbol vectors obtained may not include a plurality of common or overlapping symbol vectors.

The reception device 120 may determine one symbol vector from among the predetermined number of symbol vectors obtained by iterating the tabu search with respect to each of the symbol vectors 224, 225, 226 the predetermined number of times. For example, the reception device 120 may determine one symbol vector (for example, symbol vectors 227, 227, 229) having the lowest ML matric size, from among the predetermined number of symbol vectors obtained by iterating the tabu search with respect to each of the symbol vectors 224, 225, 226 the predetermined number of times.

Through the above-described process, the reception device 120 may determine a symbol vector including symbols corresponding to the first transmission antenna and the second transmission antenna. Although not shown, the reception device 120 may determine a symbol vector including symbols corresponding to the first, second, and third transmission antennas through the third step, and may determine a symbol vector including symbols corresponding to the first, second, third, and fourth transmission antennas through the fourth step.

As described above, signal detection is performed based on the tabu search. In this case, according to an embodiment, a certain search may be added at at least one step. Specifically, the reception device 120 may flip at least one symbol by performing a certain search while iterating the tabu search at at least one step, and may perform the tabu search again. Accordingly, a problem that may arise when only the tabu search is performed, for example, an empty vector problem and a restricted search region, may be solved. Hereinafter, a detection procedure combining a certain search and a tabu search will be described in more detail with reference to FIG. 3.

Figure 3:
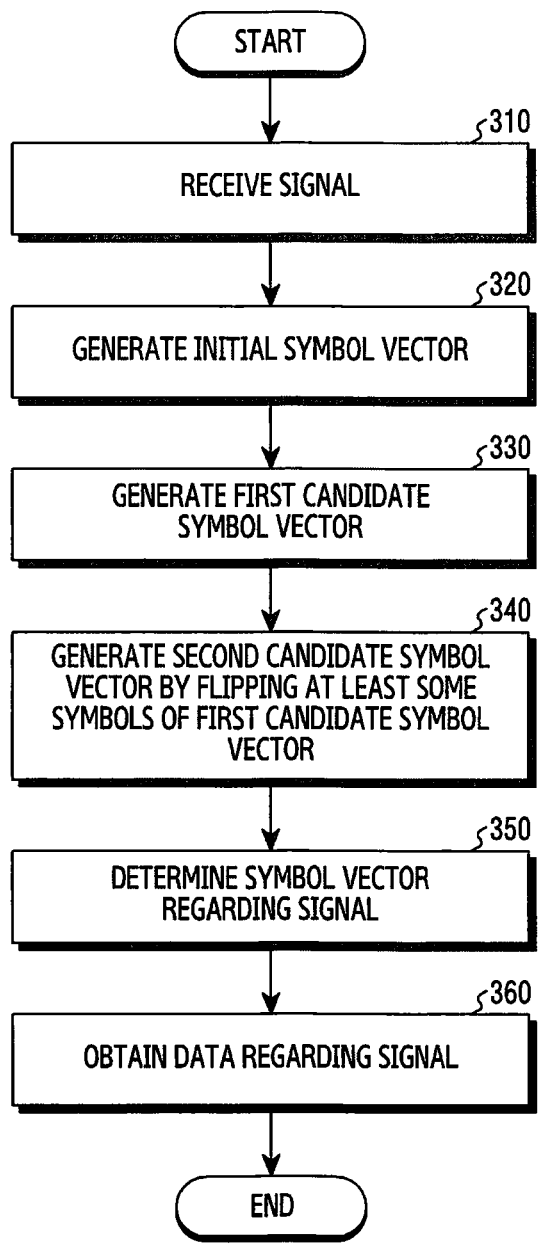
FIG. 3 is a flowchart of a reception device for determining a combination of transmission symbols according to various embodiments of the present disclosure.

FIG. 3 is a flowchart of a reception device for determining a combination of transmission symbols according to various embodiments of the present disclosure. FIG. 3 illustrates an operating method of the reception device 120.

Referring to FIG. 3, at step 310, the reception device 120 may receive a signal from the transmission device 110. According to various embodiments of the present disclosure, the transmission device 110 may include a plurality of transmission antennas, and the reception device 120 may receive signals transmitted through the plurality of transmission antennas. For example, the plurality of transmission antennas may include a first transmission antenna and a second transmission antenna. When the reception device 120 includes a plurality of reception antennas, the reception antennas may receive at least some of the signals transmitted from the plurality of transmission antennas, or a signal combining at least some signals.

At step 320, the reception device 120 may generate an initial symbol vector. The reception device 120 may generate the initial symbol vector based on the signal received at step 310. The initial symbol vector may include a plurality of symbols, and the plurality of symbols may correspond to the transmission antennas, respectively, included in the plurality of transmission antennas. For example, the initial symbol vector may include four symbols corresponding to the first transmission antenna, the second transmission antenna, the third transmission antenna, and the fourth transmission antenna, respectively. The initial symbol vector may be a symbol vector including symbols corresponding to all transmission antennas. To determine the initial symbol vector, the reception device 120 may perform a predetermined search (for example, a tabu search) a predetermined number of times (for example, 200 times) per symbol. The reception device 120 may generate a predetermined number of initial symbol vectors (for example, 4 initial symbol vectors). Herein, the predetermined number may be determined according to a selection set described in FIG. 2. For example, when the number of numerical values or indexes included in the selection set is 4, the reception device 120 may generate four (4) initial symbol vectors.

At step 330, the reception device 120 may generate a first candidate symbol vector. The reception device 120 may generate the first candidate symbol vector based on the initial symbol vector generated at step 320. The reception device 120 may generate the first candidate symbol vector based on the initial symbol vector generated at step 320, in other words, by performing a tabu search by using the initial symbol vector generated at step 320 as an initial input. The reception device 120 may generate the first candidate symbol vector by performing the tabu search a predetermined number of times (a first number of times, for example, 100 times) based on the initial symbol vector generated at step 320. The number of times the tabu search is iteratively performed at step 330 (the first number of times, for example, 100 times) may be smaller than the number of times that the tabu search is iteratively performed by the reception device 120 at each step (for example, the second to fourth steps) performed to generate the initial symbol vector at step 320.

The reception device 20 may generate a plurality of temporary solution vectors by performing the tabu search a predetermined number of times based on the initial symbol vector, prior to generating the first candidate symbol vector. Herein, the temporary solution vector is an output value which is obtained by performing a tabu search using a specific symbol vector as an input value, and may be a symbol vector having the same dimension as that of the specific symbol vector. That is, the reception device 120 may generate one temporary solution vector every time the tabu search is performed one time. Therefore, the reception device 120 may generate the predetermined number of temporary solution vectors by iterating the tabu search the predetermined number of times. Thereafter, the reception device 120 may generate the first candidate symbol vector based on the predetermined number of temporary solution vectors generated. For example, the reception device 120 may determine one temporary solution vector having the lowest ML matric size from among the predetermined number of temporary solution vectors, as the first candidate symbol vector.

When the initial symbol vector includes a plurality of symbol vectors, the reception device 120 may perform the tabu search with respect to each of the plurality of symbol vectors a predetermined number of times (the first number of times, for example, 100 times). For example, when the number of initial symbol vectors is 4, the predetermined number of times of tabu searches may be performed with respect to each of the four initial symbol vectors, and accordingly, the temporary solution vectors may be generated according to the number of times of performing the tabu search (that is, the total number of times of performing the tabu search at step 330 is 400 (4×100=400 times), 400 temporary solution vectors in total are generated). Since the tabu search of the present disclosure searches one entire tabu list, the total temporary solution vectors may not include common or overlapping temporary solution vectors. The reception device 120 may group the total temporary solution vectors according to an initial input value of the tabu search. The reception device 120 may determine the first candidate symbol vector for each group of the temporary solution vectors.

At step 340, the reception device 120 may generate a second candidate symbol vector by flipping at least some symbols of the first candidate symbol vector. The reception device 120 may generate the second candidate symbol vector by flipping at least some of the plurality of symbols forming the first candidate symbol vector. When the first candidate symbol vector includes a plurality of symbol vectors, step 340 may be performed with respect to each of the symbol vectors. For example, when the number of first candidate symbol vectors is 4 (for example, a first symbol vector, a second symbol vector, a third symbol vector, a fourth symbol vector), and the respective symbol vectors are extracted from the plurality of temporary solution vectors forming different groups (for example, a first group, a second group, a third group, and a fourth group), the reception device 120 may parse the plurality of temporary solution vectors forming the groups, and may generate respective second candidate symbol vectors by flipping some symbols of the respective symbol vectors based on a result of parsing.

At step 350, the reception device 120 may determine a symbol vector for the signal. The reception device 120 may determine a symbol vector for the signal received at step 310, based on the second candidate symbol vector determined at step 340. Specifically, the reception device 120 may generate a predetermined number (for example, 100) of a plurality of temporary solution vectors by performing the tabu search using the second candidate symbol vector determined at step 340 as an initial input, a predetermined number of times (a second number of times, for example, 100 times). In addition, the reception device 120 may determine a vector having the smallest ML matric value from among the plurality of temporary solution vectors, as the symbol vector for the signal received at step 310.

The number of times the tabu search is iteratively performed at step 350 (the second number of times, for example, 100 times) may be smaller than the number of times that the tabu search is iteratively performed by the reception device 120 at each step to generate the initial symbol vector. For example, the reception device 120 may iterate the tabu search 200 times to determine the initial symbol vector at the second step 220, and may iterate the tabu search 100 times at step 350. In addition, the number of times the tabu search is iteratively performed to generate the initial symbol vector may be the same as a sum of the first number of times and the second number of times. That is, an increase of complexity is suppressed by equally maintaining the number of times of iterating the tabu search, and a problem that may arise in the tabu search, such as an empty vector, may be solved by artificially flipping at least one symbol of the symbol vector.

At step 360, the reception device 120 may obtain data regarding the signal. The reception device 120 may obtain data regarding the signal received at step 310, based on the symbol vector determined at step 350. According to another embodiment, the reception device 120 may iterate similar operations to steps 330, 340, 350 at least one time prior to step 360.

In the embodiment described with reference to FIG. 3, the reception device 120 may flip at least some symbols at step 340. According to another embodiment, the reception device 120 may determine whether to flip at least some symbols of the first candidate symbol vector prior to step 340. For example, the reception device 120 may determine whether to flip at least some symbols of the first candidate symbol vector, based on the result of parsing the plurality of temporary solution vectors, which are used to determine the first candidate symbol vector at step 330. The reception device 120 may determine whether to flip at least some symbols of the first candidate symbol vector, based on whether a predetermined pattern is detected from the plurality of temporary solution vectors used to determine the first candidate symbol vector at step 330. When the predetermined pattern is not detected from the plurality of temporary solution vectors, the reception device 120 may not flip all symbols of the first candidate symbol vector, and may determine the first candidate symbol vector as the second candidate symbol vector as it is. However, when the predetermined pattern is detected from the plurality of temporary solution vectors, the reception device 120 may determine at least one symbol to be flipped in the first candidate symbol vector, based on at least a portion of the detected pattern, and may determine a value to which the determined at last one symbol is flipped. An operation of generating, by the reception device 120, the second candidate symbol vector by flipping at least one symbol of the first candidate symbol vector will be described in detail in FIGS. 5 to 9.

Figure 4:
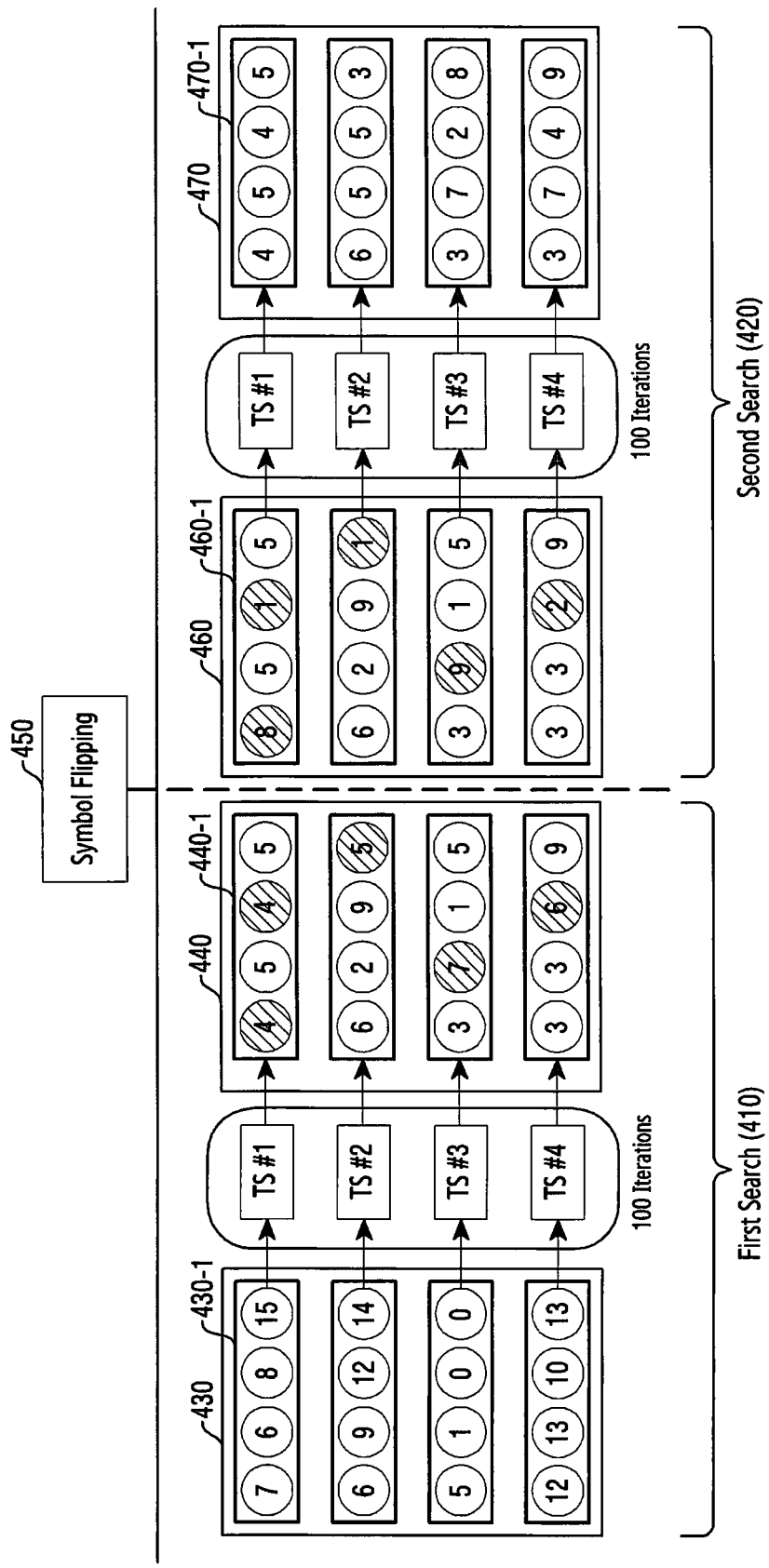
FIG. 4 is a view illustrating a procedure for determining a combination of transmission symbols according to various embodiments of the present disclosure.

FIG. 4 is a view illustrating a procedure for determining a combination of transmission symbols according to various embodiments of the present disclosure. The procedure illustrated in FIG. 4 may be performed by the reception device 120.

Referring to FIG. 4, the operations of determining the combination of transmission symbols may be divided into two operations. The two operations may include a first search 410 and a second search 420. The second search 420 may be performed after the first search 410 is performed. The operation of determining, by the reception device 120, the combination of transmission symbols may further include one or more operations in addition to the first search 410 and the second search 420, and the one or more additional operations may be performed by the reception device 120 at at least one time of before the first search 410, between the first search 410 and the second search 420, or after the second search 420.

The first search 410 may correspond to an operation of determining, by the reception device 120, a first candidate symbol vector 440 based on a determined initial symbol vector 430. The first search 410 may correspond to step 330 illustrated in FIG. 3.

The initial symbol vector 430 may include a plurality of symbol vectors (for example, 430-1), and each of the plurality of symbol vectors may include one or more symbols. The respective symbols may be symbols corresponding to different transmission antennas. For example, the initial symbol vector 430-1 is [7, 6, 8, 15], where the first symbol (7) may be a symbol corresponding to a first transmission antenna, and the second symbol (6) may be a symbol corresponding to a second transmission antenna. The third symbol (8) and the fourth symbol (15) may be parsed similarly.

The reception device 120 may determine symbols corresponding to different transmission antennas in sequence by performing a predetermined plurality of steps, prior to determining the initial symbol vector 430. For example, the reception device 120 may determine a symbol corresponding to the first transmission antenna by performing the first step, and may determine symbols corresponding to the first and second transmission antennas by performing the second step as shown in FIG. 2, and similarly, may determine symbols corresponding to the first to fourth transmission antennas by performing the third step and the fourth step. That is, the initial symbol vector 430 may be a symbol vector which is obtained by performing the first to fourth steps at the reception device 120. In another example, the initial symbol vector 430 may be a portion of temporary solution vectors obtained by performing the first to third steps at the reception device 120.

The reception device 120 may perform the first search 410 based on the initial symbol vector 430. The reception device 120 may perform the first search 410 using the initial symbol vector 430 as an initial input. The reception device 120 may generate the first candidate symbol vector 440 by performing the first search 410 using the initial symbol vector 430 as an initial input. The first search 410 using the initial symbol vector 430 as an initial input may include a predetermined number of times of tabu searches (a first number of times). Herein, the tabu search may refer to a process of determining an adjacent region of a specific symbol vector, and extracting one symbol vector from a plurality of symbol vectors included in the determined adjacent region based on an ML matric value. The predetermined number of times of tabu searches may iterate the process the predetermined number of times, and may further include a process of updating the specific symbol vector with the extracted one symbol vector, and setting a predetermined mark for a symbol vector which has been searched at least one time to prevent the same symbol vector from being searched redundantly. The extracted one or more symbol vectors may be referred to as temporary solution vectors. That is, the reception device 120 may generate a predetermined number of temporary solution vectors (for example, 100 temporary solution vectors) by performing the tabu search the predetermined number of times (the first number of times, for example, 100 times) based on the initial symbol vector 430, and may determine or extract the first candidate symbol vector 440 from among the generated temporary solution vectors. For example, the reception device 120 may generate the predetermined number of temporary solution vectors corresponding to the first number of times (not shown), by performing the tabu search the first number of times (for example, 100 times) based on the initial symbol vector 430-1 (for example, [7, 6, 8, 15]), and may determine a vector 440-1 (for example, [4, 5, 4, 5] having the lowest ML matric value from among the predetermined number of temporary solution vectors corresponding to the first number of times, as the first candidate symbol vector. When the initial symbol vector 430 includes a plurality of symbol vectors, the reception device 120 may generate a plurality of first candidate symbol vectors 440 by performing the tabu search with respect to each of the plurality of symbol vectors the predetermined number of times.

The reception device 120 may determine whether to flip some symbols of the first candidate symbol vector 440. The reception device 120 may determine whether to flip at least some symbols of the first candidate symbol vector 440, based on a result of parsing the plurality of temporary solution vectors used to determine the first candidate symbol vector 440. The reception device 120 may determine whether to flip at least some symbols of the first candidate symbol vector 440, based on whether a predetermined pattern is detected in the plurality of temporary solution vectors used to determine the first candidate symbol vector 440. For example, the reception device 120 may determine at least one symbol (the first symbol (4) corresponding to the first transmission antenna and the third symbol (4) corresponding to the third transmission antenna) to be flipped in the first candidate symbol vector 440-1, based at least in part on the pattern detected in the plurality of temporary solution vectors (not shown) used to determine the first candidate symbol vector 440-1 ([4, 5, 4, 5]), and may determine a value to which the determined at least one symbol is flipped (for example, a value (8) corresponding to the first transmission antenna, a value (1) corresponding to the third transmission antenna).

The reception device 120 may generate a second candidate symbol vector 460 based on at least one symbol to be flipped in the first candidate symbol vector 440, and a value to which the symbol is flipped. When the first candidate symbol vector 440 includes a plurality of symbol vectors, the reception device 120 may flip at least one symbol of each of the symbol vectors. For example, the reception device 120 may generate the second candidate symbol vector 460-1 ([8, 5, 1, 5]) by flipping values of the first symbol and the third symbol of the first candidate symbol vector 440-1 ([4, 5, 4, 5]).

The process of generating, by the reception device 120, the second candidate symbol vector 460 by flipping at least some symbols of the symbol vector forming the first candidate symbol vector 440 may be referred to as symbol flipping 450.

The reception device 120 may perform the second search 420 based on the second candidate symbol vector 460. The second search 420 may correspond to step 350 illustrated in FIG. 3.

The reception device 120 may perform the second search 420 based on the second candidate symbol vector 460, that is, by using the second candidate symbol vector 460 as an initial input. The reception device 120 may generate a third candidate symbol vector 470 by performing the second search 420 using the second candidate symbol vector 460 as an initial input. The second search 420 using the second candidate symbol vector 460 as an initial input may include a predetermined number of times of tabu searches (a second number of times). The second number of times may be the same as or different from the first number of times. The process of generating, by the reception device 120, the third candidate symbol vector 470 by performing the second search 420 based on the second candidate symbol vector 460 is the same as the process of generating the first candidate symbol vector 440 by performing the first search 410 based on the initial symbol vector 430, and thus a detailed description thereof is omitted.

Figure 5:
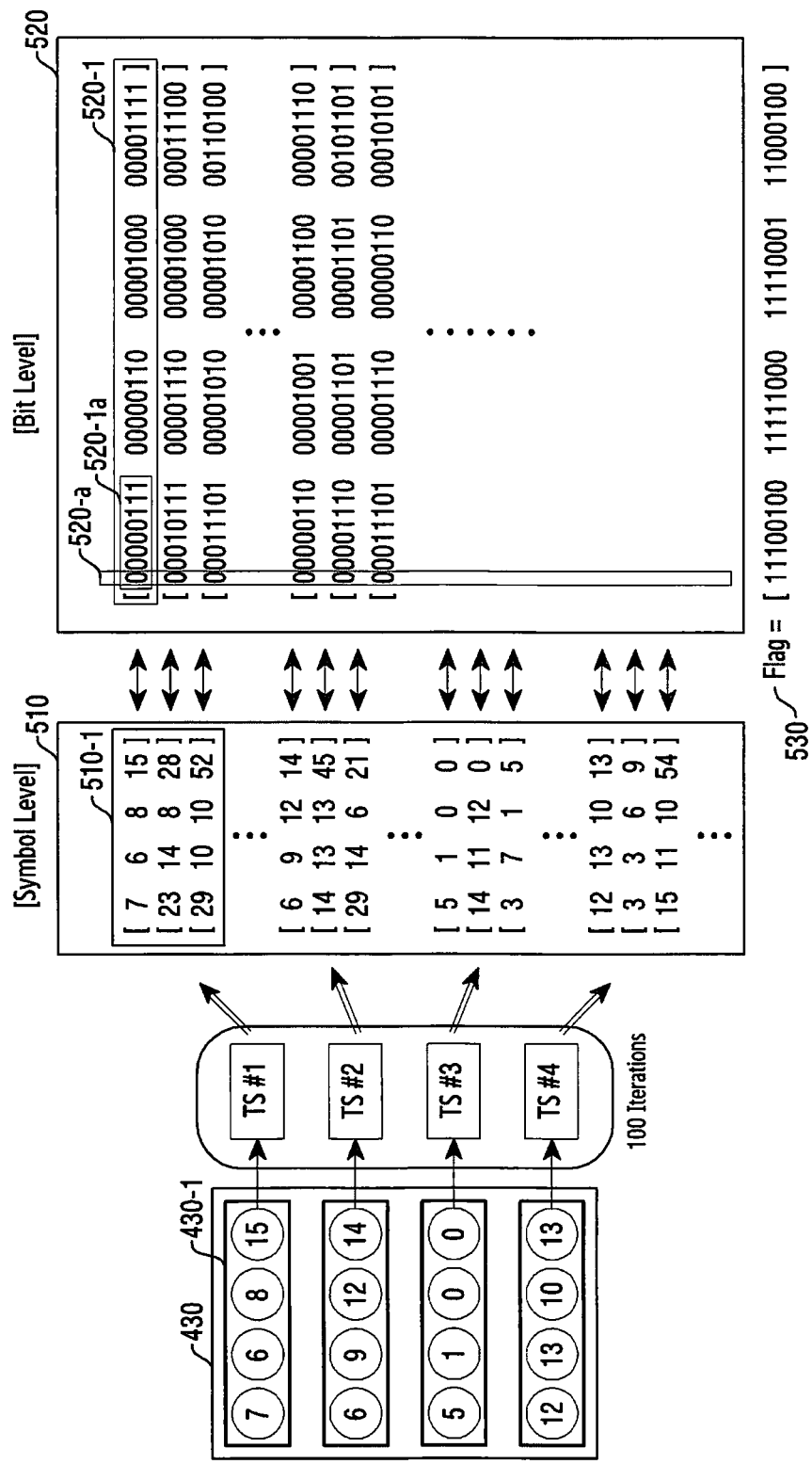
FIG. 5 is a view illustrating a procedure for determining a combination of transmission symbols according to various embodiments of the present disclosure.

FIG. 5 is a view illustrating a procedure for determining a combination of transmission symbols according to various embodiments of the present disclosure. Referring to FIG. 5, a portion of the operation of determining the combination of transmission symbols may be performed at the reception device 120. The operation of determining the combination of transmission symbols, illustrated in FIG. 5, may be a portion of step 340 of FIG. 3, or a portion of the first search 410 of FIG. 4. More specifically, the operation illustrated in FIG. 5 is an operation of determining whether a predetermined pattern is detected in the plurality of temporary solution vectors used to determine the first candidate symbol vector 440.

The reception device 120 may perform the first search 410 based on the initial symbol vector 430. The reception device 120 may perform the first search 410 using the initial symbol vector 430 as an initial input. The first search 410 using the initial symbol vector 430 as an initial input may include a predetermined number of times of tabu searches (a first number of times, for example, 100 times), and the reception device 120 may determine one temporary solution vector every time one tabu search is performed. For example, the reception device 120 may generate a predetermined number of temporary solution vectors 510-1 (for example, 100 temporary solution vectors) by performing the tabu search the predetermined number of times (the first number of times, for example, 100 times) based on the initial symbol vector 430-1, that is, by using the initial symbol vector 430-1 as an initial input.

When the initial symbol vector 430 includes a plurality of symbol vectors, the reception device 120 may perform the tabu search with respect to each of the plurality of symbol vectors the predetermined number of times. The reception device 120 may perform the first search 410 by using the plurality of symbol vectors included in the initial symbol vector 430 as initial inputs. In addition, the reception device 120 may generate the predetermined number of temporary solution vectors by performing the first search 410 using the plurality of symbol vectors included in the initial symbol vector 430 as initial inputs. In this case, a set of the predetermined number of temporary solution vectors generated respectively may be referred to as total temporary solution vectors 510.

The reception device 120 may group the total temporary solution vectors 510 according to the initial input of the tabu search. For example, the reception device 120 may group the predetermined number of temporary solution vectors 510-1, which are generated by performing the first search 410 using the initial symbol vector 430-1 as an initial input.

The reception device 120 may parse the total temporary solution vectors 510 or a portion of the total temporary solution vectors 510 (for example, 510-1). When the initial symbol vector 430 includes a plurality of symbol vectors, the number of the total temporary solution vectors 510 may be the same as a product of the first number of times (for example, 100 times) and the number of symbol vectors included in the initial symbol vector 430 (for example, 4). That is, the reception device 120 may parse a portion of the total temporary solution vectors 510 generated by performing the first search based on all symbol vectors included in the initial symbol vector 430, or may parse a portion of the total temporary solution vectors 510 determined according to a specific criterion. For example, the reception device 120 may parse a portion of the temporary solution vectors (for example, 510-1) grouped with reference to the initial input of the first search 410, from among the total temporary solution vectors 510.

The reception device 120 may convert the total temporary solution vectors 510 from a symbol level to a bit level. The reception device 120 may generate total bit stream vectors 520 by converting the total temporary solution vectors 510 from the symbol level to the bit level. The number of the total bit stream vectors 520 may be the same as the number of the total temporary solution vectors 510. One bit stream vector (for example, 520-1) included in the total bit stream vectors 520 may include a predetermined number of bit streams (for example, 4 bit streams), and one bit stream (for example, 520-1*a*) may include a combination of a predetermined number of bits (for example, 8 bits). Herein, the number of bit streams (for example, 4) forming one bit stream vector (for example, 520-1) may correspond to the number of transmission antennas or the dimension of the initial symbol vector 430, and the number of bits (for example, 8) forming one bit stream may correspond to a modulation order. In other words, the number of bits forming one bit stream may be determined according to a modulation order. For example, when the modulation order is 8, the symbols forming the total temporary solution vectors 510 may refer to one symbol among 256 symbols in total in constellation corresponding to 256-QAM, and thus the number of bits forming one bit stream may be determined as 8. This is because 8 bits are required to express the 256 symbols at the bit level.

The reception device 120 may group the bit streams included in the total bit stream vectors 520. The reception device 120 may group the bit streams included in the respective bit stream vectors forming the total bit stream vectors 520 according to a position or a corresponding transmission antenna. For example, the reception device 120 may group the first bit streams (that is, bit streams corresponding to the first transmission antenna, for example, 520-1*a*) from among the bit streams included in the respective bit stream vectors. In addition, the reception device 120 may group the second bit streams, the third bit streams, or the fourth bit streams from among the bit streams included in the respective bit stream vectors.

The reception device 120 may sub-group the bits included in the grouped plurality of bit streams according to a position of the bits. For example, bits 520-*a* at the first position from among the bits included in the bit streams grouped based on the first bit streams may be sub-grouped.

The reception device 120 may parse the sub-grouped plurality of bits (for example, 520-*a*). The reception device 120 may determine whether a predetermined pattern is detected, by parsing the sub-grouped plurality of bits (for example, 520-*a*). In other words, the reception device 120 may determine whether a predetermined number of same bits (for example, 0) or more are detected or the same bits are detected by a predetermined ratio or higher, from among the sub-grouped plurality of bits (for example, 520-*a*). For example, the reception device 120 may determine whether 0 is detected by 90% or higher in the sub-grouped plurality of bits 520-*a*. In addition, various values other than 90% may be set as a threshold ratio.

The reception device 120 may generate a specific bit stream vector by parsing the sub-grouped plurality of bits. The specific bit stream vector may be referred to as a flag 530. The flag 530 may be a bit stream vector that has the same dimension as that of each bit stream vector (for example, 520-1) forming the total bit stream vectors 520. That is, the flag 530 may be a bit stream vector that has the same dimension (for example, 4) as that of the initial symbol vector 430.

When a predetermined pattern is detected in a specific sub-group, the reception device may set a specific bit value (for example, 1) to a position of the flag 530 which is the same as the position corresponding to the specific sub group. For example, when a specific pattern is detected in the sub-group 520-*a* indicating the first position of the first bit stream, the reception device 120 may set 1 to the first position of the first bit stream of the flag 530. Although not shown, the reception device 120 may generate the flag 530 by parsing the sub-grouped plurality of bits for all sub groups.

The flag 530 may be an indicator indicating a position where an empty vector problem arises or a specific bit appears at a very low frequency. The empty vector problem refers to a problem that, when candidate symbol vectors have all the same value at a specific bit in obtaining soft decision information regarding respective bits forming a transmission symbol vector, a Euclidean distance regarding an opposite bit value may not be obtained, and thus a log likelihood ratio (LLR) regarding the corresponding bit may not be calculated.

The present disclosure suggests a method for artificially changing a value of a problematic bit or symbol to deal with the empty vector problem, and the flag 530 may serve as an indicator indicating the position of the problematic bit or symbol. To achieve this, a value of each bit of the flag 530 indicates whether bits of candidate symbol vectors at a corresponding position have all the same value. In the case of FIG. 5, since the first bits of the candidate symbol vectors are all 0, the first bit of the flag 530 is set to 1.

The reception device 120 may determine a flag without converting the total temporary solution vectors 510 into vectors of the bit level although not shown. In this case, the determined flag may be a flag of a symbol level. In other words, the reception device 120 may parse the total temporary solution vectors 510 at the symbol level, and may generate the flag of the symbol level based on the result of parsing at the symbol level. For example, the reception device 120 may group the symbols included in the total temporary solution vectors 510 according to a position or a corresponding transmission antenna (for example, the first symbol). In addition, the reception device 120 may determine whether a predetermined pattern is detected, by parsing the grouped plurality of symbols (for example, group of the first symbols [7, 23, 29, . . . ]. The reception device 120 may determine whether a predetermined number of same symbols (for example, 7) or more are detected in the grouped plurality of symbols, or the same symbols are detected by a predetermined ratio or higher. When the same symbol (for example, 7) is detected in the grouped plurality of symbols by 90% or higher, the reception device 120 may determine the flag of the symbol level based on the position of the grouped plurality of symbols (for example, the first symbols). In this case, the flag of the symbol level generated may be a symbol vector of the same dimension as that of the temporary solution vector (for example, 510-1), and may be used for next symbol flipping. For example, the flag of the symbol level may be used to determine a position of a symbol to be flipped, or a value of a symbol to be flipped. In another example, the flag of the symbol level may be used to determine a symbol flipping pattern. In still another example, the flag of the symbol level may be converted into a flag of a bit level, and may be used to determine a symbol flipping pattern. In yet another example, when the predetermined pattern is detected in the grouped plurality of symbols (first symbols), the reception device 120 may not determine the flag of the symbol level, and may randomly flip values of the first symbols of the total temporary solution vectors 510.

The predetermined ratio is 90%, for example, but the present disclosure is not limited thereto. Various values other than 90% may be set as a ratio. For example, when the same symbol or same bit is detected by 80% or higher, the reception device 120 may determine a flag of a symbol level or a flag of a bit level regarding a corresponding position. Additionally, according to various embodiments, the ratio may be changed in phases according to whether a signal is successfully detected.

Figure 6:
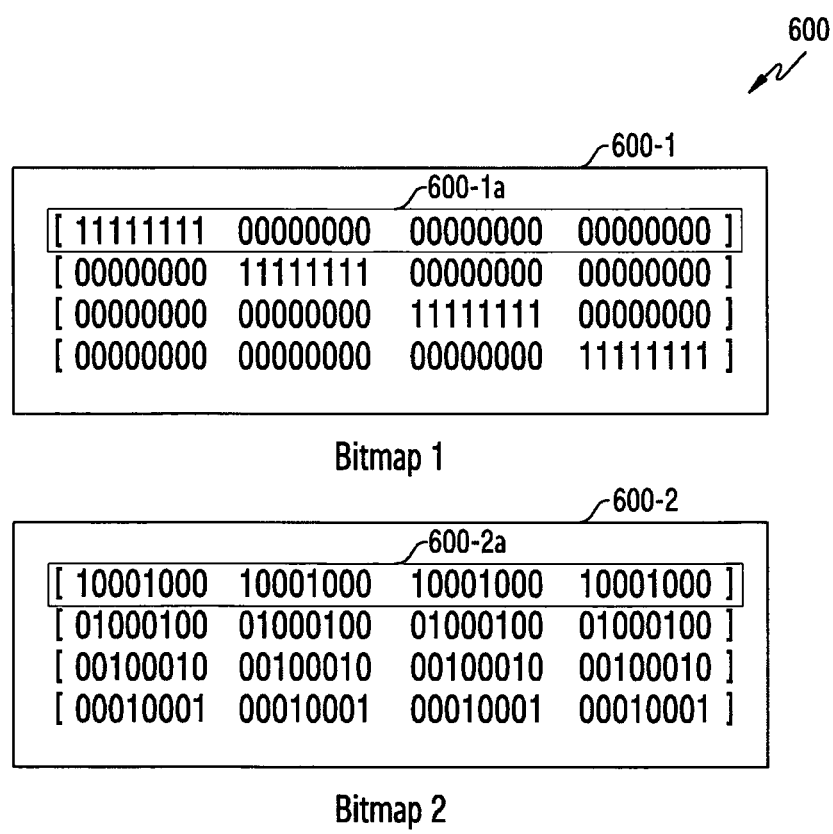
FIG. 6 is a view illustrating a portion of a selectable bitmap according to various embodiments of the present disclosure.

FIG. 6 is a view illustrating a portion of a selectable bitmap according to various embodiments of the present disclosure. Referring to FIG. 6, a bitmap 600 may be an indicator for determining at least one symbol to be flipped in the first candidate symbol vector 440. In other words, the bitmap 600 may be used to determine at least one symbol to which the flag 530 is applied. In addition, when the first candidate symbol vector 440 includes a plurality of symbol vectors, the bitmap 600 may be an indicator for determining at least one symbol to be flipped regarding each of the plurality of symbol vectors. In other words, the bitmap 600 may be information for determining at least one symbol to which the flag 530 is applied with respect to each of the plurality of symbol vectors.

The bitmap 600 may be a matrix which is formed of a predetermined number of bit streams. The bitmap 600 may be a matrix of 4×4 as shown in FIG. 6. The number of rows of the bitmap 600 may correspond to the number of numerical values or indexes included in a selection set. The number of columns of the bitmap 600 may correspond to the number of transmission antennas or the dimension of the initial symbol vector 430. For example, when the number of numerical values or indexes included in the selection set is 3, and the transmission antennas include 4 antennas, the bitmap 600 may be a matrix of 3×4. Elements in each matrix may be expressed by binary bits as shown in FIG. 6.

A combination of at least one symbol to which the flag 530 is applied may be determined variously, and therefore, the bitmap 600 may not be determined as a single bitmap. For example, the bitmap 600 may be a bitmap 600-1 or a bitmap 600-2. Although only two bitmaps are illustrated in FIG. 6 for convenience of explanation, various bitmaps may be provided, and may be pre-stored in the reception device 120. The reception device 120 may select or determine one bitmap based on a combination of symbols to be flipped from among symbol vectors forming the first candidate symbol vector. In addition, the reception device 120 may learn the process of selecting one of the stored various bitmaps by itself (for example, machine learning). For example, the reception device 120 may use one bitmap among the stored various bitmaps in sequence, and may learn to determine a bitmap providing better performance (for example, BER performance).

Each row of the bitmap 600 (for example, 600-1*a*, 600-2*a*) may correspond to each symbol vector forming the first candidate symbol vector 440. For example, the first row 600-1 a of the bitmap 600-1 or the first row 600-2*a* of the bitmap 600-2 may correspond to the first symbol vector 440-1 included in the first candidate symbol vector 440. In another example, the second row of the bitmap 600-1 may correspond to the second symbol vector included in the first candidate symbol vector 440.

The bitmap 600-1 may be a bitmap for changing only one symbol in one symbol vector (for example, 440-1) included in the first candidate symbol vector 440. For example, the first row 600-1*a* of the bitmap 600-1 may be a bit stream vector for changing only one symbol (for example, the first symbol 4 of the first symbol vector 440-1) of the first symbol vector 440-1 forming the first candidate symbol vector 440. The bit 0 in the bit stream forming the bitmap is a bit indicating inactivation of symbol flipping, and the bit 1 is a bit indicating activation of symbol flipping in a specific condition. That is, since the second, third, and fourth bit streams in the first row 600-1*a* are all formed of 0, the second, third, and fourth symbols forming the first candidate symbol vector 440 are not flipped. In addition, since the first bit stream is formed of 1, the first symbol of the first candidate symbol vector 440 may be flipped in a specific condition.

The bitmap 600-2 may be a bitmap for changing a plurality of symbols in one symbol vector (for example, 440-1) included in the first candidate symbol vector 440. For example, the first row 600-2a of the bitmap 600-2 may be a bit stream vector for changing the first to fourth symbols in the first symbol vector 440-1 forming the first candidate symbol vector 440 in a specific condition. Since all bit streams of the first row 600-2a include at least one 1, values of all of the symbols of the first symbol vector 440-1 forming the first candidate symbol vector 440, that is, the first to fourth symbols, may be flipped in a specific condition.

Figure 7:
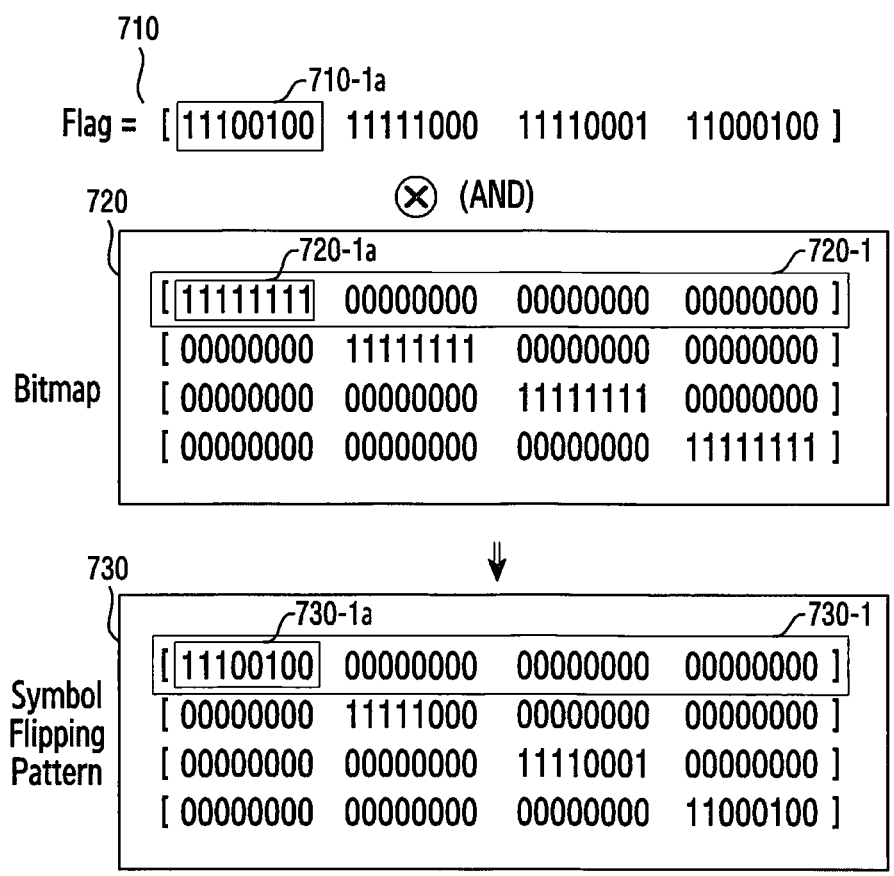
FIG. 7 is a view illustrating a procedure for generating a symbol flipping pattern to flip at least one symbol of a first candidate symbol vector according to various embodiments of the present disclosure.

FIG. 7 is a view illustrating a procedure for generating a symbol flipping pattern to flip at least one symbol of a first candidate symbol vector according to various embodiments of the present disclosure. Operations illustrated in FIG. 7 may be performed at the reception device 120.

Referring to FIG. 7, the reception device 120 may generate a symbol flipping pattern 730 by using a flag 710 and a bitmap 720. The reception device 120 may generate the symbol flipping pattern 730 through an AND operation of the flag 710 and the bitmap 720. The flag 710 may be a bit stream vector of the same dimension (for example, fourth dimension) as that of the initial symbol vector 430, and each row of the bitmap 720 may be a bit stream vector of the same dimension as that of the initial symbol vector 430, and the number of bits forming the bit streams included in the flag 710 is the same as the number of bits forming bit streams included in each row of the bitmap 720. Accordingly, the reception device 120 may perform an AND operation with respect to the flag 710 and the bitmap 720. The reception device 120 may perform an AND operation with respect to the flag 710 and each row of the bitmap 720. The reception device 120 may generate bit streams to be included in each row of the symbol flipping pattern 730, by performing the AND operation with respect to the flag 710 and each row of the bitmap 720. For example, the reception device 120 may generate bit streams to be included in the first row of the symbol flipping pattern 730 by performing the AND operation with respect to the flag 710 and the first row of bitmap 720.

The flag 710 is information indicating a position where an empty vector problem arises or a specific bit appears at a very low frequency, and may be the same as the flag 530 disclosed in FIG. 5. The bitmap 720 may be information indicating a symbol to be changed in one symbol vector (for example, 440-1) included in the first candidate symbol vector 440. The bitmap 720 may be the bitmap 600-1 or the bitmap 600-2 illustrated in FIG. 6.

The symbol flipping pattern 730 may be a matrix which is formed of bit streams obtained through the AND operation between the flag 710 and the bitmap 720. The number of rows of the symbol flipping pattern 730 may correspond to the number of rows of the bitmap 720 used to generate the symbol flipping pattern 730. Accordingly, the number of rows of the symbol flipping pattern 730 may be determined according to the number of numerical values or indexes included in the selection set illustrated in FIG. 2. The number of columns of the symbol flipping pattern 730 may correspond to the number of columns of the flag 710 or the bitmap 720. Accordingly, the number of columns of the symbol flipping pattern 730 may correspond to the number of transmission antennas or the dimension of the initial symbol vector 430.

The reception device 120 may compare two corresponding bit values of the flag 710 and the bitmap 720, and may generate the symbol flipping pattern 730 based on comparison values. For example, the reception device 120 may generate a bit stream [11100100] by performing the AND operation between the first bit stream [11100100] 710-a of the flag 710, and the first bit stream [11111111] 720-1 a of the first row 720-1 of the bitmap 720. The reception device 120 may determine the generated bit stream [11100100] as the first bit stream 730-1 a of the first row 730-1 of the symbol flipping pattern 730. In the same way, the reception device 120 may generate bit streams to be included in the first row 730-1 of the symbol flipping pattern 730, by performing the AND operation between the second to fourth bit streams of the flag 710, and corresponding bit streams included in the first row 720-1 of the bitmap 720. Through a similar process, the reception device 120 may generate the other rows of the symbol flipping pattern 730.

Each row of the symbol flipping pattern 730 may be used to flip at least one symbol of each symbol vector forming the first candidate symbol vector 440. For example, the first row 730-1 of the symbol flipping pattern 730 may be used to flip at least one symbol of the first symbol vector 440-1 forming the first candidate symbol vector 440.

Figure 8:
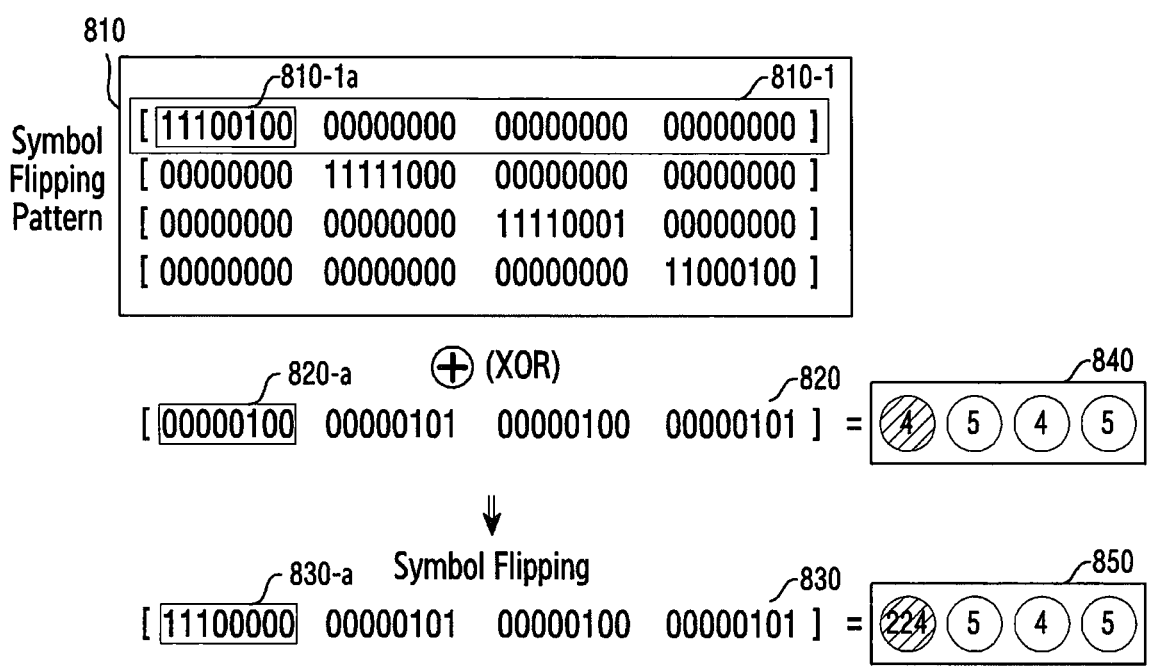
FIG. 8 is a view illustrating a procedure for flipping at least one symbol of a first candidate symbol vector according to various embodiments of the present disclosure.

FIG. 8 is a view illustrating a procedure for flipping at least one symbol of a first candidate symbol vector according to various embodiments of the present disclosure. The operation of flipping at least one symbol of a first candidate symbol vector 840, illustrated in FIG. 8, may be performed by the reception device 120.

Referring to FIG. 8, the reception device 120 may generate a second candidate symbol vector 850 from the first candidate symbol vector 840 by using a symbol flipping pattern 810. The symbol flipping pattern 810 may be a matrix which is formed of bit streams obtained through the AND operation between the flag 710 and the bitmap 720. The symbol flipping pattern 810 may be the same as the symbol flipping pattern 730. Since the bitmap 720 is a bitmap for changing one symbol in the first candidate symbol vector 840, each row of the symbol flipping pattern 810 may include one bit stream 810-1 a including at least one 1, and the other bit streams may be bit streams which are all formed of 0. Each row of the symbol flipping pattern 810 may be used to flip at least one symbol of each symbol vector forming the first candidate symbol vector 440. For example, the first row of the symbol flipping pattern 810 may be used to flip at least one symbol of the first symbol vector 440-1 forming the first candidate symbol vector 440.

At least one symbol of the first candidate symbol vector 840 may be flipped based on the symbol flipping pattern 810. The first candidate symbol vector 840 may be one symbol vector forming the first candidate symbol vector 440. For example, the first candidate symbol vector 840 may be the first symbol vector 440-1 forming the first candidate symbol vector 440. As shown in FIG. 4, the first candidate symbol vector 440 may be formed of the plurality of symbol vectors (for example, 440-1). When the first candidate symbol vector 440 is formed of the plurality of symbol vectors, the reception device 120 may perform a bitwise operation (for example, an XOR operation) between each symbol vector and each row of the symbol flipping pattern 810. For example, the reception device 120 may perform a bitwise operation (for example, an XOR operation) between the first symbol vector 440-1 forming the first candidate symbol vector 440, and the first row of the symbol flipping pattern 810, and may perform a bitwise operation (for example, an XOR operation) between the second symbol vector forming the first candidate symbol vector 440, and the second row of the symbol flipping pattern 810. However, only one symbol vector 840 forming the first candidate symbol vector 440 is illustrated in FIG. 8 for convenience of explanation.

The first candidate symbol vector 840 may be a vector which is expressed at the symbol level. Accordingly, to perform the bitwise operation between the first candidate symbol vector 840 and the symbol flipping pattern 810, the reception device 120 should convert the first candidate symbol vector 840 from the symbol level to the bit level. The reception device 120 may perform the bitwise operation (for example, an XOR operation) with respect to the first candidate symbol vector 820 expressed at the bit level with the symbol flipping pattern 810. For example, the reception device 120 may perform the bitwise operation (for example, an XOR operation) between the first bit stream [11100100] 810-1 of the first row 810-1 of the symbol flipping pattern 810, and the first bit stream [00000100] 820-*a* of the first candidate symbol vector 820 expressed at the bit level. The reception device 120 may determine the second candidate symbol vector 830 expressed at the bit level, based on a result of performing the bitwise operation (for example, an XOR operation), and may convert the second candidate symbol vector 830 expressed at the bit level to the symbol vector at the symbol level. Accordingly, the reception device 120 may determine the second candidate symbol vector 850 expressed at the symbol level.

In the example illustrated in FIG. 8, the reception device 120 flips only one symbol of the first candidate symbol vector 840. This is because the number of bits streams 810-1*a* including at least one 1 in the first row of the symbol flipping pattern 810 used for symbol flipping is 1. Specifically, this is because the symbol flipping pattern 810 used for symbol flipping is generated based on the bitmap 720. Since the bit stream 810-1*a* including at least one 1 in the first row of the symbol flipping pattern 810 is the first bit stream, the first symbol of the first candidate symbol vector 840 expressed at the symbol level may be flipped. For example, the first symbol of the first candidate symbol vector 840 may be flipped from 4 to 224. When there are a plurality of bit streams including at least one 1 in each row of the symbol flipping pattern 810, a plurality of symbols included in the first candidate symbol vector 840 may be flipped.

Figure 9:
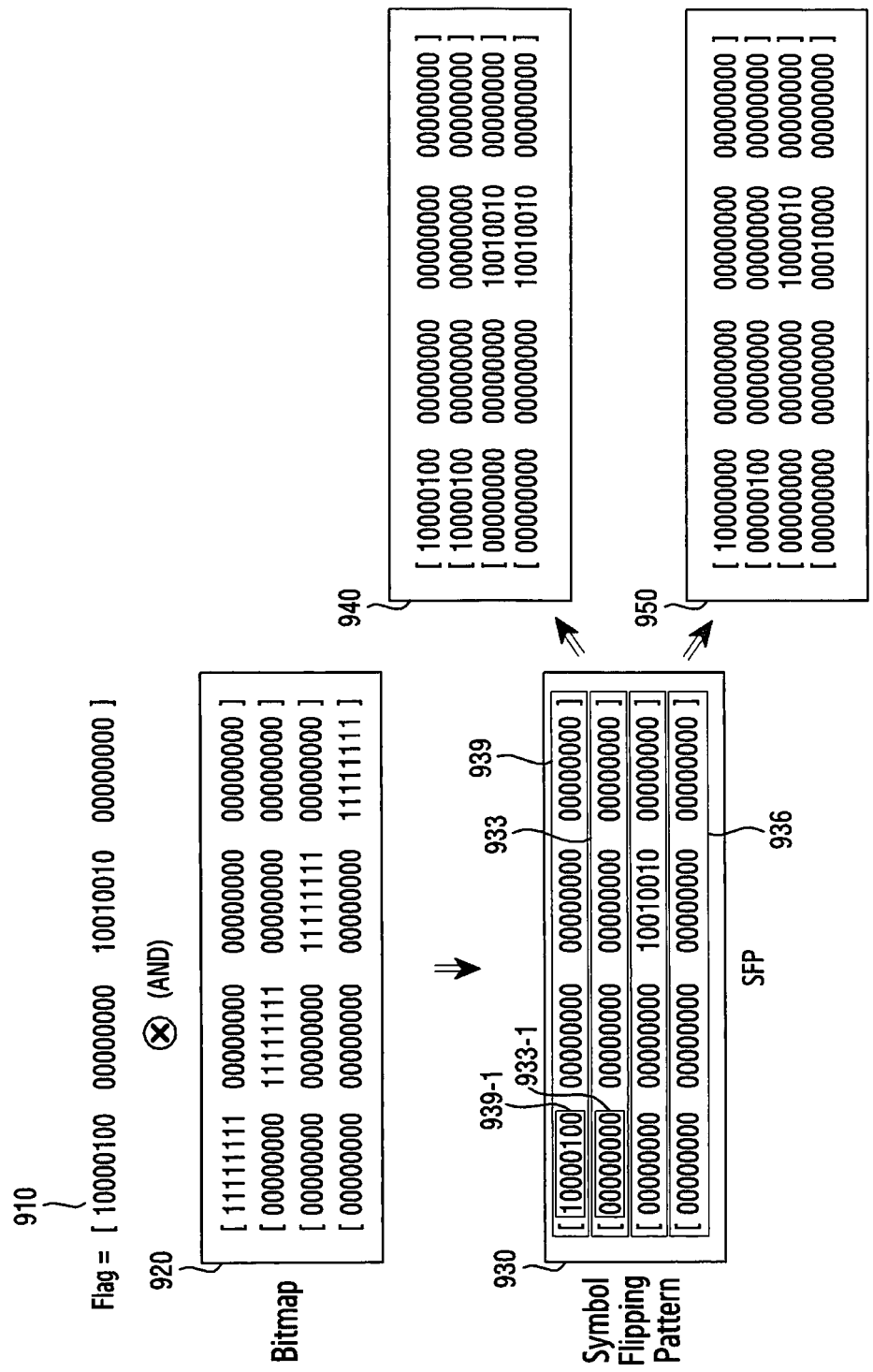
FIG. 9 is a view illustrating a procedure for generating a symbol flipping pattern to flip at least one symbol of a first candidate symbol vector according to various embodiments of the present disclosure.

FIG. 9 is a view illustrating a procedure for generating a symbol flipping pattern to flip at least one symbol of a first candidate symbol vector according to various embodiments of the present disclosure. The operation of generating the symbol flipping pattern to flip at least one symbol of the first candidate symbol vector, illustrated in FIG. 9, may be performed at the reception device 120.

Referring to FIG. 9, the reception device 120 may determine a symbol flipping pattern 930 by using a flag 910 and a bitmap 920. The reception device 120 may determine the symbol flipping pattern 930 by performing an AND operation between the flag 910 and each row of the bitmap 920.

The flag 910 may be an indicator indicating a position where an empty vector problem arises or a specific bit appears at a very low frequency.

The bitmap 920 may be a bitmap for changing at least one symbol in the first candidate symbol vector 440. For example, the bitmap 920 may be the bitmap 720-1.

Each row of the symbol flipping pattern 930 may be used to flip at least one symbol of each symbol vector forming the first candidate symbol vector 440. For example, the first row of the symbol flipping pattern 930 may be used to flip at least one symbol of the first symbol vector 440-1 forming the first candidate symbol vector 440.

The reception device 120 may determine whether a predetermined pattern is detected in the symbol flipping pattern 930. When the symbol flipping pattern 930 includes at least one row including the predetermined pattern, the reception device 10 may determine that the predetermined pattern is detected in the symbol flipping pattern 930. In addition, when all bit streams included in a specific row are formed of only 0, the reception device 120 may determine that the specific row includes the predetermined pattern. For example, the reception device 120 may determine that all bit streams included in the second row 933 and the fourth row 936 of the symbol flipping pattern 930 are bit streams formed of only 0. Accordingly, the reception device 120 may determine that the predetermined pattern is detected in the symbol flipping pattern 930, based on the second row 933 and the fourth row 936 of the symbol flipping pattern 930.

When the predetermined pattern is detected in the symbol flipping pattern 930, the reception device 120 may convert the symbol flipping pattern 930. The reception device 120 may generate a new symbol flipping pattern 940 or 950 based on the symbol flipping pattern 930. The reception device 120 may convert at least one bit stream of the row of the symbol flipping pattern 930 including the predetermined pattern, based on at least one bit stream of the row that does not include the predetermined pattern. For example, the reception device 120 may convert the first bit stream 933-1 of the second row 933 of the symbol flipping pattern 930, based on the first bit stream 939-1 of the first row 939.

Unlike the symbol flipping pattern 930, the new symbol flipping pattern 940 or 950 may be a symbol flipping pattern in which the predetermined pattern is not detected. That is, each row of the new symbol flipping pattern 940 or 950 may include at least one bit stream including at least one 1.

The reason why the new symbol flipping pattern in which the predetermined pattern is not detected is generated when the predetermined pattern is detected in the symbol flipping pattern 930 is that symbol flipping is impossible with respect to the row in which the predetermined pattern is detected. Specifically, the reception device 120 may perform symbol flipping through a bitwise operation (XOR operation) between each row of the symbol flipping pattern 930 and each symbol vector forming the first candidate symbol vector, as shown in FIG. 8. When a specific row of the symbol flipping pattern 930 includes the predetermined pattern (that is, when all bit streams included in the specific row are formed of only 0), all of the bit values are equally maintained due to a characteristic of the XOR operation. That is, symbol flipping is not performed. Accordingly, when the predetermined pattern is detected in the symbol flipping pattern 930, the reception device 120 needs to generate a new symbol flipping pattern in which the predetermined pattern is not detected. Hereinafter, two methods for generating the new symbol flipping pattern based on the symbol flipping pattern 930 when the predetermined pattern is detected in the symbol flipping pattern 930 will be described.

In the first method, when at least one row of the symbol flipping pattern 930 includes the predetermined pattern, the reception device 120 may select one row that does not include the predetermined pattern to change at least one bit stream of the row including the predetermined pattern. In addition, the reception device 120 may select an adjacent row of the row including the predetermined pattern to change at least one bit stream of the row including the predetermined pattern. For example, the reception device 120 may select the first row 939 that does not include the predetermined pattern to change at least one bit stream of the second row 933 including the predetermined pattern.

The reception device 120 may generate the new symbol flipping pattern 940 by changing at least one bit stream of the row including the predetermined pattern to the same bit stream as at least one bit stream of the row that does not include the predetermined pattern. The reception device 120 may change the at least one bit stream of the row including the predetermined pattern to a bit stream at the same position as that of the at least one bit stream in the row including the predetermined pattern. For example, the reception device 120 may determine the second row 933 including the predetermined pattern in the symbol flipping pattern 930, and may change the first bit stream [00000000] 933-1 of the second row 933 including the predetermined pattern to the same bit stream as the first bit stream [10000100] 939-1 of the first row 939 that does not include the predetermined pattern. Accordingly, the reception device 120 may determine the new symbol flipping vector 940 in which all rows do not include the predetermined pattern. Although FIG. 9 depicts that the first bit stream 933-1 of the row 933 including the predetermined pattern is converted based on the first row 939 that does not include the predetermined pattern, the first bit stream 933-1 of the row 933 may be converted based on the third row that does not include the predetermined pattern.

The reception device 120 may determine a bit stream to be converted in the row including the predetermined pattern, based on an order or a position of a bit stream including at least one 1, included in the row that does not include the predetermined pattern. For example, the reason why the reception device 120 changes the first bit stream 933-1 of the second row 933 including the predetermined pattern is that the bit stream including at least one 1 in the first row 939 that does not include the predetermined pattern is the first bit stream. In another example, when the reception device 120 changes one bit stream of the second row 933 including the predetermined pattern, based on the third row that does not include the predetermined pattern, the reception device 120 may change the third bit stream of the second row 933. This is because the third bit stream of the third row is a bit stream including at least one 1.

In the second method, when the predetermined pattern is detected in the symbol flipping pattern 930, the reception device 120 may generate the new symbol flipping pattern 950 by changing the symbol flipping pattern. The new symbol flipping pattern 950 may be a symbol flipping pattern in which the predetermined pattern is not detected.

The reception device 120 may change at least one bit stream of the row including the predetermined pattern to a bit stream different from at least one bit stream of the row that does not include the predetermined pattern. Specifically, the reception device 120 may divide at least one bit stream of the row that does not include the predetermined pattern into two bit streams, and may determine at least one bit stream of the row including the predetermined pattern as one of the two divided bit streams, and may determine at least one bit stream of the row that does not include the predetermined pattern as the other one of the two divided bit streams. The at least one bit stream of the row that does not include the predetermined pattern, and the at least one bit stream of the row that does not include the pattern may correspond to each other in their orders or positions. For example, the reception device 120 may divide the first bit stream 939-1 of the row 939 that does not include the predetermined pattern into two bit streams [10000000] and [00000100]. Thereafter, the reception device 120 may change the first bit stream of the row 931 that does not include the predetermined pattern to one of the two divided bit streams, [10000000], and may change the first bit stream of the row 932 including the predetermined pattern to the other one of the two divided bit streams, [00000100].

When the symbol flipping pattern 930 includes at least two rows including the predetermined pattern, the reception device 120 may generate a new symbol flipping pattern that does not include the predetermined pattern by applying a different method to each row. For example, when the symbol flipping pattern includes two rows (for example, 933, 936) including the predetermined pattern, the reception device 120 may apply a method of copying a bit stream included in the row that does not include the predetermined pattern to the row 933, and may apply a method of dividing a bit stream included in the row that does not include the predetermined pattern to the row 936.

The reception device 120 may flip at least one symbol of the first candidate symbol vector by using the new symbol flipping pattern 940, 950, and may determine a symbol corresponding to a transmission antenna based on the first candidate symbol vector having at least one symbol flipped.

Figure 10:
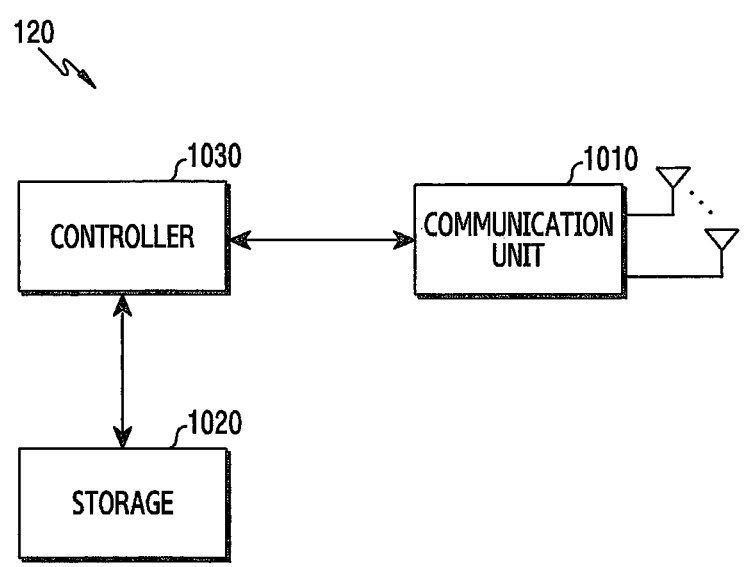
FIG. 10 is a view illustrating a functional configuration of a reception device 120 in a wireless communication system according to various embodiments of the present disclosure.

FIG. 10 is a view illustrating a functional configuration of the reception device 120 in the wireless communication system according to various embodiments of the present disclosure. The configuration illustrated in FIG. 10 may be understood as a configuration of the reception device 120 of FIG. 1. The term "unit" or terms ending with suffixes "-er," and "-or" used in the following description refer to a unit processing at least one function or operation, and may be implemented by hardware, software, or a combination of hardware and software. In addition, as described above, the functions of a device are not limited by the name of the device, and in the following description, the reception device 120 includes not only a configuration for receiving signals from the transmission device 110 of FIG. 1, but also a configuration for transmitting signals to the transmission device 110.

Referring to FIG. 10, the reception device 120 may include a communication unit 1010, a storage 1020, and a controller 1030.

The communication unit 1010 may perform functions for transmitting and receiving signals via a wireless channel. For example, the communication unit 1010 may perform a function of converting between a baseband signal and a bit stream according to a physical layer standard of the system. For example, when transmitting control information, the communication unit 1010 may generate modulation symbols by encoding and modulating a transmission bit stream. In addition, when receiving data, the communication unit 1010 may restore a reception bit stream by demodulating and decoding a baseband signal. In addition, the communication unit 1010 may up-convert a baseband signal into a radio frequency (RF) band signal, and then may transmit the signal via an antenna, and may down-convert an RF band signal received via an antenna into a baseband signal. For example, the communication unit 1010 may include a decoder, a demodulator, an analogue-to-digital converter (ADC), a reception filter, an amplifier, a mixer, and an oscillator. In addition, the communication unit 1010 may additionally include an encoder, a modulator, a digital-to-analogue converter (DAC), and a transmission filter for transmitting signals.

The communication unit 1010 may include a plurality of antennas. The communication unit 1010 may receive a plurality of streams through the plurality of antennas. In addition, the communication unit 1010 may include a plurality of RF chains. Furthermore, the communication unit 1010 may perform beamforming. For beamforming, the communication unit 1010 may adjust a phase and a size of each signal transmitted and received through the plurality of antennas or antenna elements, that is, may perform analogue beamforming. Alternatively, the communication unit 1010 may perform beamforming with respect to a digital signal, that is, digital beamforming.

The communication unit 1010 may transmit and receive signals as described above. Accordingly, the communication unit 1010 may be referred to as a "transmitter," "receiver," or "transceiver." In addition, in the following description, transmitting and receiving via a radio channel may include processing by the communication unit 1010 as described above.

The storage 1020 may store data such as a basic program for the operation of the reception device 120, an application program, setting information, etc. The storage 1020 may include a volatile memory, a nonvolatile memory, or a combination of a volatile memory and a nonvolatile memory. In addition, the storage 1020 may provide stored data according to a request of the controller 1030.

The controller 1030 controls overall operations of the reception device 120. For example, the controller 1030 may transmit and receive signals via the communication unit 1010. In addition, the controller 1030 may write or read out data on or from the storage 1020. To achieve this, the controller 1030 may include at least one processor or microprocessor, or may be a portion of a processor. In addition, a portion of the communication unit 1010 and the controller 1030 may be referred to as a communication processor (CP). In particular, the controller 1030 may detect symbols received from the transmission device 110 based on a reception algorithm, and may decode signals according to various embodiments described above.

FIG. 10 illustrates the configuration of the reception device 120. Herein, when the configuration of FIG. 10 is a configuration of a base station, the configuration may further include a backhaul communication unit for providing an interface for communicating with a backhaul network.

In the present disclosure, expressions "greater than or equal to" (or exceeding) or "less than or equal to" (or less than) are used to determine whether a specific condition is fulfilled. However, these expressions are merely an example, and expressions "exceeding" (or greater than or equal to) or "less than" (or less than or equal to) are not excluded. For example, a condition described with "greater than or equal to" may be substituted with a condition with expression "exceeding," a condition described with "less than or equal to" may be substituted with a condition with "less than," a condition described with "exceeding" may be substituted with a condition with "greater than or equal to," a condition described with "less than" may be substituted with a condition with "less than or equal to," a condition described with "greater than or equal to and less than" may be substituted with a condition with "exceeding and less than or equal to," and a condition described with "exceeding and less than or equal to" may be substituted with a condition with "greater than or equal to and less than."

Methods based on the claims or the embodiments disclosed in specification of the present disclosure may be implemented in hardware, software, or a combination of both. When implemented in software, a computer readable storage medium for storing one or more programs (software modules) may be provided. The one or more programs stored in the computer readable storage medium are configured for execution performed by one or more processors in an electronic device. The one or more programs include instructions for allowing the electronic device to execute the methods based on the claims or the embodiments disclosed in specification of the present disclosure. The program (the software module or software) may be stored in a random access memory, a non-volatile memory including a flash memory, a read only memory (ROM), an electrically erasable programmable read only memory (EEPROM), a magnetic disc storage device, a compact disc-ROM (CD-ROM), digital versatile discs (DVDs) or other forms of optical storage devices, and a magnetic cassette. Alternatively, the program may be stored in a memory configured in combination of all or some of these storage media. In addition, the configured memory may be plural in number.

Further, the program may be stored in an attachable storage device capable of accessing the electronic device through a communication network such as the Internet, an Intranet, a local area network (LAN), a wide LAN (WLAN), or a storage area network (SAN) or a communication network configured by combining the networks. The storage device may access via an external port to a device which performs the embodiments of the present disclosure. In addition, an additional storage device on a communication network may access to a device which performs the embodiments of the present disclosure.

In the above-described specific embodiments of the present disclosure, elements included in the present disclosure are expressed in singular or plural forms according to specific embodiments. However, singular or plural forms are appropriately selected according to suggested situations for convenience of explanation, and the present disclosure is not limited to a single element or plural elements. An element which is expressed in a plural form may be configured in a singular form or an element which is expressed in a singular form may be configured in plural number.

While the invention has been shown and described with reference to certain preferred embodiments thereof, it will be understood by those skilled in the art that various changes in form and details may be made therein without departing from the spirit and scope of the invention as defined by the appended claims. Therefore, the scope of the invention is defined not by the detailed description of the invention but by the appended claims, and all differences within the scope will be construed as being included in the present invention.

The invention claimed is:

1. An operating method of a reception device in a wireless communication system, the method comprising:
receiving a signal transmitted through a plurality of antennas of a transmission device;
determining an initial symbol vector based on the signal;
determining a first candidate symbol vector based on a plurality of solution vectors which are obtained by a search on the initial symbol vector;
determining a second candidate symbol vector by flipping at least one symbol value of the first candidate symbol vector; and
determining a symbol vector transmitted from the transmission device based on at least a portion of the second candidate symbol vector.

2. The method of claim 1, wherein the search comprises a tabu search which is iterated a predetermined number of times.

3. The method of claim 1, wherein determining the second candidate symbol vector comprises:

determining a first indicator indicating a position where a specific bit appears at a predetermined frequency or lower when the plurality of solution vectors are expressed at a bit level.

4. The method of claim 3, wherein determining the second candidate symbol vector comprises:
determining a second indicator for determining at least one symbol to be flipped in the first candidate symbol vector.

5. The method of claim 4, wherein determining the second candidate symbol vector comprises:
determining a symbol flipping pattern based on a result of performing an arithmetic operation between the first indicator and the second indicator.

6. The method of claim 5, wherein determining the second candidate symbol vector comprises:
flipping a value of the at least one symbol, based on a result of performing an arithmetic operation between the first candidate symbol vector and the symbol flipping pattern.

7. The method of claim 5, wherein determining the symbol flipping pattern comprises:
determining a first symbol flipping pattern based on the result of performing the arithmetic operation between the first indicator and the second indicator;
determining whether a predetermined pattern is detected in the first symbol flipping pattern; and
when the predetermined pattern is detected in the first symbol flipping pattern, determining a second symbol flipping pattern based on the first symbol flipping pattern.

8. The method of claim 7, wherein determining whether the predetermined pattern is detected in the first symbol flipping pattern comprises:
determining a row in which the predetermined pattern is detected from among one or more rows forming the first symbol flipping pattern.

9. The method of claim 8, wherein determining the second symbol flipping pattern based on the first symbol flipping pattern comprises changing a first bit stream included in the row in which the predetermined pattern is detected to a same bit stream as a second bit stream included in a row in which the predetermined pattern is not detected.

10. The method of claim 8, wherein determining the second symbol flipping pattern based on the first symbol flipping pattern comprises:
dividing the second bit stream included in the row in which the predetermined pattern is not detected into a third bit stream and a fourth bit stream;
changing the first bit stream included in the row in which the predetermined pattern is detected to a bit stream which is the same as the third bit stream; and
changing the second bit stream to a bit stream which is the same as the fourth bit stream.

11. A reception device in a wireless communication system, the reception device comprising:
a transceiver configured to receive a signal transmitted through a plurality of antennas of a transmission device; and
at least one processor operably coupled to the transceiver, and configured to:
determine an initial symbol vector based on the signal, the initial symbol vector comprising a plurality of symbols corresponding to the plurality of antennas of the transmission device, respectively;
determine a first candidate symbol vector based on a plurality of solution vectors which are obtained by a search on the initial symbol vector; to determine a second candidate symbol vector by flipping at least one symbol value of the first candidate symbol vector; and
determine a symbol vector transmitted from the transmission device based on at least a portion of the second candidate symbol vector.

12. The reception device of claim 11, wherein the search comprises a tabu search which is iterated a predetermined number of times.

13. The reception device of claim 11, wherein the at least one processor is configured to determine a first indicator indicating a position where a specific bit appears at a predetermined frequency or lower, in case that the plurality of solution vectors are expressed at a bit level.

14. The reception device of claim 13, wherein the at least one processor is configured to determine a second indicator for determining at least one symbol to be flipped in the first candidate symbol vector.

15. The reception device of claim 14, wherein the at least one processor is configured to determine a symbol flipping pattern based on a result of performing an arithmetic operation between the first indicator and the second indicator.

16. The reception device of claim 15, wherein the at least one processor is configured to flip a value of the at least one symbol, based on a result of performing an arithmetic operation between the first candidate symbol vector and the symbol flipping pattern.

17. The reception device of claim 15, wherein the at least one processor is configured to:
determine a first symbol flipping pattern based on the result of performing the arithmetic operation between the first indicator and the second indicator;
determine whether a predetermined pattern is detected in the first symbol flipping pattern; and
in case that the predetermined pattern is detected in the first symbol flipping pattern, determine a second symbol flipping pattern based on the first symbol flipping pattern.

18. The reception device of claim 17, wherein the at least one processor is configured to determine a row in which the predetermined pattern is detected from among one or more rows forming the first symbol flipping pattern.

19. The reception device of claim 18, wherein the at least one processor is configured to change a first bit stream included in the row in which the predetermined pattern is detected to a same bit stream as a second bit stream included in a row in which the predetermined pattern is not detected.

20. The reception device of claim 18, wherein the at least one processor is configured to:
divide the second bit stream included in the row in which the predetermined pattern is not detected into a third bit stream and a fourth bit stream;
change the first bit stream included in the row in which the predetermined pattern is detected to a bit stream which is the same as the third bit stream; and
change the second bit stream to a bit stream which is the same as the fourth bit stream.

* * * * *